(12) United States Patent
Singh et al.

(10) Patent No.: US 11,888,682 B2
(45) Date of Patent: Jan. 30, 2024

(54) AUTOMATED SYSTEM FOR HEALING FAULTY NODE IN A NETWORK AND METHOD THEREOF

(71) Applicant: Samsung Electronics Co., Ltd., Suwon-si (KR)

(72) Inventors: Gurdev Singh, Bangalore (IN); Naresh Kumar Eddlakadi Yadu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 17/547,868

(22) Filed: Dec. 10, 2021

(65) Prior Publication Data

US 2022/0103421 A1    Mar. 31, 2022

Related U.S. Application Data

(63) Continuation of application No. PCT/KR2020/004858, filed on Apr. 9, 2020.

(30) Foreign Application Priority Data

Jun. 13, 2019   (IN) .............................. 201911023525
Apr. 3, 2020    (KR) ........................ 10-2020-0040888

(51) Int. Cl.
*H04L 41/046*     (2022.01)
*H04L 41/0654*    (2022.01)
(Continued)

(52) U.S. Cl.
CPC ........ *H04L 41/0661* (2023.05); *H04L 41/046* (2013.01); *H04L 41/0677* (2013.01);
(Continued)

(58) Field of Classification Search
CPC ............... H04L 41/046; H04L 41/0661; H04L 41/0677; H04L 41/0893; H04L 41/14;
(Continued)

(56) References Cited

U.S. PATENT DOCUMENTS 4,380,811 A    4/1983   Gotze et al.
4,747,080 A    5/1988   Yamada
(Continued)

FOREIGN PATENT DOCUMENTS

CN    101741619 A    6/2010
CN    202696288 A    1/2013
(Continued)

OTHER PUBLICATIONS

Rui Liu et al. (Trust-Aware Behavior Reflection for Robot Swarm Self-Healing, In Session 1B: Multi-Robot System, AAMAS 2019, Montreal, Canada, May 17, 2019) (Year: 2019).*
(Continued)

*Primary Examiner* — Melvin C Marcelo
*Assistant Examiner* — Natali Pascual Peguero
(74) *Attorney, Agent, or Firm* — Jefferson IP Law, LLP

(57) ABSTRACT

A self-healing system for healing electronic devices in a network is provided. The system includes a memory configured to store pre-defined rules and a processor which is operatively connected to the memory configured to form a swarm the electronic devices connected in the network, store first data and second data which are related to the electronic devices on the formed swarm in a database of the swarm, compute third data of the electronic devices on the formed swarm based on the first data, compare the third data with the first data related to the electronic devices, identify a faulty of the electronic devices on the swarm based on the compared results, and correct the faulty of the electronic devices which are identified by applying the second data.

14 Claims, 14 Drawing Sheets

(51) Int. Cl.
*H04L 41/0677* (2022.01)
*H04L 41/0893* (2022.01)
*H04L 41/14* (2022.01)
*H04L 69/40* (2022.01)
*H04L 41/0659* (2022.01)

(52) U.S. Cl.
CPC .......... *H04L 41/0893* (2013.01); *H04L 41/14* (2013.01); *H04L 69/40* (2013.01)

(58) Field of Classification Search
CPC ..... H04L 41/142; H04L 41/16; H04L 67/025; H04L 69/40; H04L 41/0894
See application file for complete search history.

(56) References Cited

U.S. PATENT DOCUMENTS

| | | | |
|---|---|---|---|
| 2005/0276228 A1* | 12/2005 | Yavatkar | H04L 63/0227 370/242 |
| 2006/0291482 A1 | 12/2006 | Evans | |
| 2009/0177757 A1 | 7/2009 | Pottenger | |
| 2011/0051627 A1 | 3/2011 | El-Damhougy | |
| 2013/0008036 A1 | 1/2013 | Gringer et al. | |
| 2013/0080360 A1* | 3/2013 | Sterritt | G06N 3/02 706/14 |
| 2014/0074799 A1 | 3/2014 | Karampuri et al. | |
| 2016/0248836 A1 | 8/2016 | Agarwal et al. | |

FOREIGN PATENT DOCUMENTS

| | | |
|---|---|---|
| CN | 104092211 A | 10/2014 |
| CN | 105589768 A | 5/2016 |
| CN | 107371125 A | 11/2017 |
| CN | 108846484 A | 11/2018 |
| KR | 10-0942156 B1 | 2/2010 |

OTHER PUBLICATIONS

Notice of Hearing dated Jan. 24, 2023, issued in Indian application No. 201911023525.

Trust-Aware Behavior Reflection for Robot Swarm Self-Healing by Rui Liu, Fan Jia, Wenhao, Luo, Meghan Chandarana, May 13-17, 2019, Montreal, Canada.

Indian Office Action dated Jan. 20, 2021, issued in Indian Application No. 201911023525.

Rui Liu et al. Trust-Aware Behavior Reflection for Robot Swarm Self-Healing. In: Session 1B: Multi-Robot System, AAMAS 2019, Montreal, Canada, May 17, 2019, pp. 122-130. p. 122, right col. line 3—p. 129, right col. line 30; and, figure 2.

International Search Report dated Jul. 13, 2020 issued in International Patent Application No. PCT/KR2020/004858.

* cited by examiner

AUTOMATED SYSTEM FOR HEALING FAULTY NODE IN A NETWORK AND METHOD THEREOF

CROSS-REFERENCE TO RELATED APPLICATION(S)

This application is a continuation application, claiming priority under § 365(c), of an International application number PCT/KR2020/004858, filed on Apr. 9, 2020, which is based on and claims priority of an Indian patent application number 201911023525, filed on Jun. 13, 2019, in the Indian intellectual Property Office, and of a Korean patent application number 10-2020-0040888, filed on Apr. 3, 2020, in the Korean Intellectual Properly Office, the disclosure of each of which is incorporated by reference herein in its entirety.

BACKGROUND

1. Field

The disclosure relates to healing systems. More particularly, the disclosure relates to systems and methods for healing a faulty node in a network.

2. Description of Related Art

Systems of the related art have been developed to eliminate the manual process. The systems of the related art provide self-healing properties to each nodes of the network to detect and diagnose the technical issues without involving the human intervention. However, the system of the related art is limited to resolve specific technical issue(s). Further, each node of the network heals itself. The majority logic of other healthy nodes of the network cannot heal the faulty nodes of the network.

For example, Chinese Application No, CN104092211 describes a switch optimization configuration method adapted to the self-healing requirement of a smart distribution network. Specifically, it describes self-healing of power distribution switch using pre-defined formulas in distributed networks on the basis of a predefined index. However, it uses predefined factors to take decisions for healing of a system.

U.S. Patent Application Publication No. 20140074799 A1 describes pro-active self-healing in a distributed file system. A first server identifies a second server connecting to a cluster of servers in a file system. The first server examines a file in a replication directory hierarchy in the second server. This system has a server based approach to identify the next server to serve the content so that the device can be live. This approach is not having a localization decision approach to self-heal the system.

U.S. Patent Application Publication No. 20160248836 A1 describes a scalable self-healing architecture for client-server operations in transient connectivity conditions. An application in a second system receives a request from a first system, the request requesting data from a type of service. A first response responds to the request. The request is queued in a service queue corresponding to the type of the service, to make the request available to a third system that provides the type of the service. U.S. Patent Application Publication No. 20160248836 A1 describes a client server based approach, and not server free approach. In this, communication between servers are performed to identify best case for handling a condition, and also not having a majority logic approach and a local decision of the devices.

U.S. Patent Application Publication No. 20050276228 A1 describes self isolating and self-healing networked devices for monitoring a host electronic system to determine whether the host electronic system is operating within a predefined operating profile. In this, each device would be running under predefined rules, a Watch-dog kind of approach, and the system cannot adjust dynamically based on majority logic.

Chinese Application No, CN105589768A describes a self-healing fault-tolerant computer system. The on-board computer system is the use of redundant elements or components to mask a fault has occurred on the impact generated by the system. In this, self-healing is using a duplicate system to replace the original node efficiently. It does not identify the problem node or correcting using majority logic.

Therefore, there is a need of an automated system and method that limits the aforementioned drawbacks and provides healing a faulty node in a network by using majority logic or collective decision of other nodes of the network.

The above information is presented as background information only to assist with an understanding of the disclosure. No determination has been made, and no assertion is made, as to whether any of the above might be applicable as prior art with regard to the disclosure.

SUMMARY

Typically, recovering faulty nodes in a network is a difficult task. For example, many display units are deployed at public places for advertisement, etc., such as at Airport, Food Courts, Hospitals, Hotels, Market Areas, Parking Areas, and the like. The display units include televisions, video walls, and the like. However, maintaining and recovering these display units are difficult tasks, in a case of technical issues such as debugging, software, black screen, freezing, hardware such as panels, and the like, which causes switch off the display units, and provide negative impression to public. To resolve these issues, technical expertise is required. However, a technical expert can resolve these issues manually, such as visiting a place, checking each display unit, identifying an issue, and resolve the issue. This process is error prone, cumbersome, and time consuming.

Aspects of the disclosure are to address at least the above-mentioned problems and/or disadvantages and to provide at least the advantages described below. Accordingly, an aspect of the disclosure is to provide a self-healing system for healing electronic devices in a network.

Additional aspects will be set forth in part in the description which follows and, in part, will be apparent from the description, or may be learned by practice of the presented embodiments.

In accordance with an aspect of the disclosure, a method for self-healing electronic devices in a network is provided. The method includes forming, by a swarm creation module, a swarm of a plurality of electronic devices connected in the network, storing first data and second data related to the plurality of electronic devices in a database of the swarm, computing, based on the first data, third data of the plurality of electronic devices, comparing the third data with the first data related to the plurality of electronic devices, identifying, based on the comparison, a faulty electronic device of the plurality of electronic devices, and correcting, by applying the second data, the identified faulty electronic device.

In accordance with another aspect of the disclosure, a self-healing system for healing electronic devices in a network is provided. The system includes a memory configured to store pre-defined rules and a processor which is operatively connected to the memory configured to form a swarm of a plurality of electronic devices connected in the network, store first data and second data related to the plurality of electronic devices in a database of the swarm, compute third data of the plurality of electronic devices based on the first data, compare the third data with the first data related to the plurality of electronic devices, identify a faulty electronic device of the plurality of electronic devices based on the comparison, and correct the faulty of the electronic devices which are identified by applying the second data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
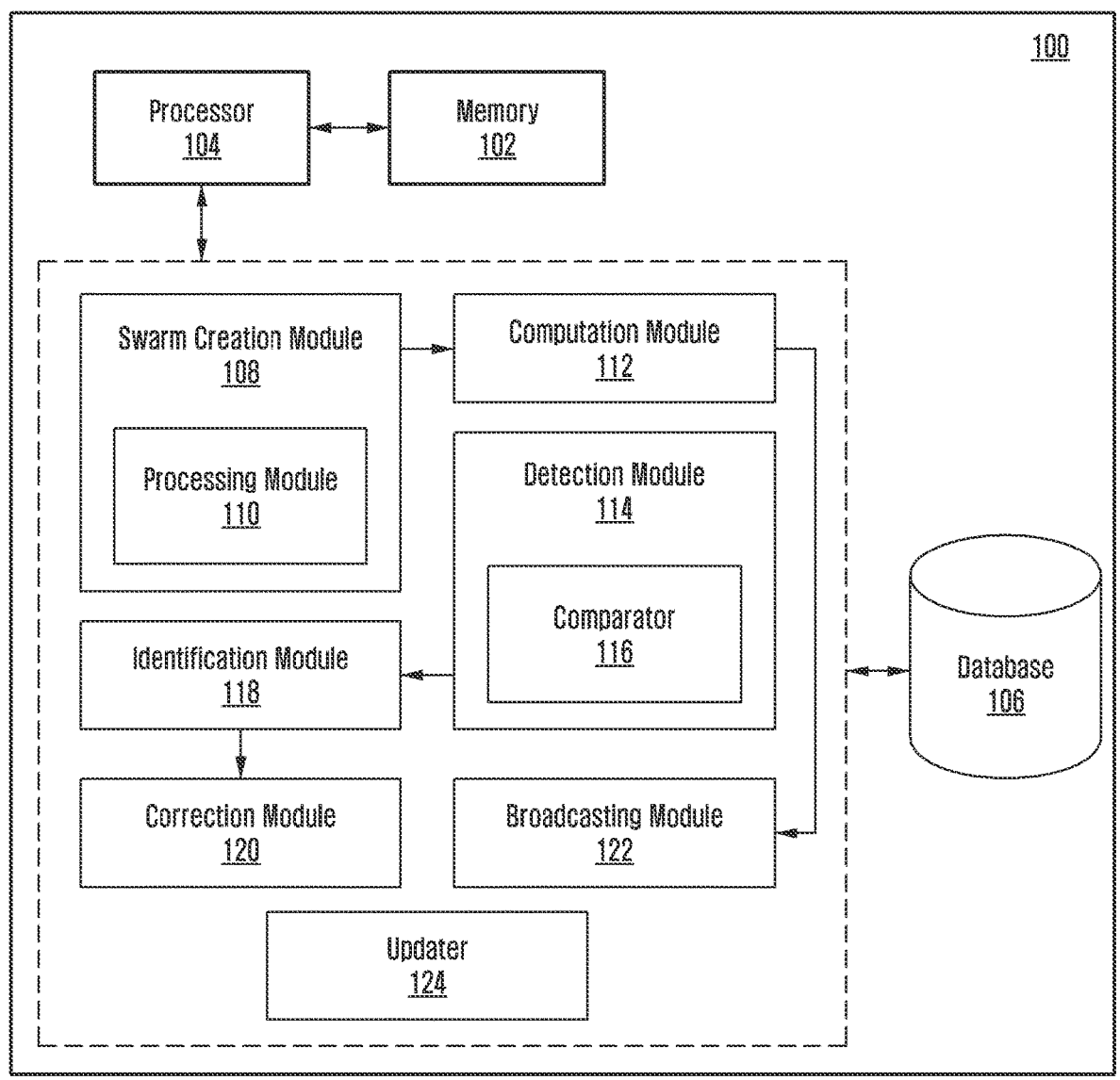
FIG. 1 illustrates a block diagram depicting an automated system for healing a faulty node in a network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments of the disclosure provide an automated system for healing a faulty node in a network and method thereof.

Furthermore, connections between components and/or modules within the figures are not intended to be limited to direct connections. Rather, these components and modules may be modified, re-formatted or otherwise changed by intermediary components and modules.

References in the disclosure to "one embodiment" or "an embodiment" mean that a particular feature, structure, characteristic, or function described in connection with the embodiment is included in at least one embodiment of the disclosure. The appearances of the phrase "in one embodiment" in various places in the specification are not necessarily all referring to the same embodiment.

In one of the embodiments of the disclosure, a method for healing a faulty node in a network includes an operation of storing, in a database, pre-defined attributes related to nodes, nodes properties of the nodes, and pre-determined healing profiles. The method includes an operation of creating, by a swarm creation module, a swarm of one or more nodes in the network based on the stored properties of the nodes. The method includes an operation of computing, by a computation module, a fitness value of each of the nodes based on the pre-defined attributes of each of the nodes on the swarm. The method includes an operation of detecting, by a detection module, an anomaly of at least one node based on the fitness value using a swarm based logic technique. The method includes an operation of identifying, by the detection module, the faulty node based on the detected anomaly. The method includes an operation of identifying, by an identification module, a control mechanism based on a healing profile. The method includes an operation of transmitting, by the identification module, the identified control mechanism to the identified faulty node. The method includes an operation of correcting, by a correction module, the faulty node by applying the control mechanism to the faulty node on the swarm.

In another implementation, the method includes broadcasting, by a broadcasting module, the fitness value of each of the nodes to other nodes on the swarm.

In another implementation, the nodes properties of each node include information related to a node type, a node identification number (ID), neighbor nodes, Internet Protocol (IP) address, hardware, schedule data, and firmware data including a product family, version details and function sets.

In an embodiment, the nodes include electronic devices, such as video-walls, television, smart TVs, and any type of display screens.

In another implementation, pre-defined attributes include CPU (Central Processing Unit) usage, resource utilization, available memory, connection status, black screen, standby mode, response time, picture properties, on screen display, audio, broadcasting, network, and other system attributes including accessibility, power control, and the like.

In another implementation, the method includes comparing, by a comparator, the fitness value of each node with other nodes for detecting the anomaly of at least one node based on the pre-defined attributes using the swarm based logic technique, and identifying the faulty node based on the detected anomaly.

In another implementation, the swarm based logic technique includes a majority logic technique, a predictive behavior technique, and a relative logic based technique.

In another implementation, the majority logic technique includes collective decision of one or more healthy lodes to handle faulty node failures on the swarm.

In another implementation, the method includes detecting, by the detection module, the faulty node whose fitness value is not equal to majority value of the one or more healthy nodes, and the majority value is identified by the majority logic technique.

In another implementation, the method includes determining, by the identification module, the healing profile based on at least one of detection, correction, or prediction of the anomaly.

In another implementation, the method includes transmitting, by the identification module, the identified control mechanism to other nodes on the swarm, based on the healing profile using machine learning techniques or learning correction patterns.

In another implementation, the method includes updating, by an updater, the healing profile of the one or more nodes of said swarm, by using learning correction patterns.

In another implementation, the method includes updating, by the updater, the healing profile of a plurality of nodes of other swarm with updated healing profile of the one or more nodes of the swarm, by using learning correction patterns.

In another implementation, creating, by the swarm creation module, the swarm of one or more nodes in the network using at least one of ant colony optimization, flocking, or particle swarm optimization technique.

In another implementation, creating, by the swarm creation module, the swarm of the one or more nodes, further includes operations of: computing, by a processing module, the nodes properties of the one or more nodes; generating, by the processing module, a string for each of the computed nodes properties of the nodes; broadcasting, by the processing module, the generated string for the nodes on the swarm; and joining the swarm by one of the nodes after receiving a response from a swarm manager in a predefined time.

In another implementation, each of the nodes include its own fitness value and other nodes fitness values.

In another implementation, the method includes identifying, by the identification module, the control mechanism based on the healing profile of the identified faulty node.

In another implementation, the control mechanism includes a control message, a healing message, a control command, or a control signal.

In another implementation, transmitting, by any node of the swarm, the control mechanism to the faulty node and bringing the faulty node in normal state.

In another implementation, transmitting, by the one or more nodes, the control mechanism to the faulty device, is an agent node.

In another implementation, sending, by the agent node, the control mechanism to the faulty device.

In another implementation, the method includes randomly selecting, by the swarm creation module, the agent node from the one or more nodes available on said swarm.

In another implementation, each healing profile includes a set of commands or signals to heal the node from the state of the faulty node.

In another embodiment, an automated system for healing a faulty node in a network includes a memory, a processor, a database, a swarm creation module, a computation module, a detection module, an identification module, and a correction module. The memory is configured to store pre-defined rules. The processor is configured to generate system processing commands based on the pre-defined rules. The database is configured to store pre-defined attributes related to nodes, nodes properties of the nodes, and pre-determined healing profiles. The swarm creation module is configured to create a swarm of one or more nodes in the network based on the stored properties of the nodes. The computation module is configured to compute a fitness value of each of the nodes based on the pre-defined attributes of each of the nodes on the swarm. The detection module is configured to detect an anomaly of at least one node based on the fitness value using a swarm based logic technique, and identify the faulty node based on the detected anomaly. The identification module is configured to identify a control mechanism based on a healing profile, and transmit the identified control mechanism to the identified faulty node. The correction module is configured to correct the faulty node by applying the control mechanism to the faulty node on the swarm.

In another implementation, the system includes a broadcasting module configured to broadcast the fitness value of each of the nodes to other nodes on the swarm.

In another implementation, the identification module is configured to determine the healing profile based on at least one of detection, correction, or prediction of the anomaly.

In another implementation, the identification module is configured to transmit the identified control mechanism to other nodes on the swarm based on the healing profile using machine learning techniques or learning correction patterns.

In another implementation, the identification module is configured to identify the control mechanism based on the healing profile of the identified faulty node.

In another implementation, the system includes an updater configured to update the healing profile of the one or more nodes of the swarm, by using learning correction patterns.

In another implementation, the updater is configured to update the healing profile of a plurality of nodes of other swarm with updated healing profile of the one or more nodes of the swarm, by using learning correction patterns.

In another implementation, the detection module is configured to detect the faulty node whose fitness value is not equal to majority value of the one or more healthy nodes, and the majority value is identified by the majority logic technique.

In another implementation, the detection module includes a comparator. The comparator is configured to compare the fitness value of each node with other nodes to detect the anomaly of at least one node based on the pre-defined attributes using the swarm based logic technique, and identify the faulty node based on the detected anomaly.

In another implementation, any node from the one or more nodes on the swarm is configured to transmit the control mechanism to the faulty node and to bring the faulty node in normal state.

In another implementation, the one or more nodes which transmit the control mechanism to the faulty device, is an agent node.

In another implementation, the agent node is configured to send the control signals to the faulty device.

In another implementation, the swarm creation module is configured to randomly select the agent node from the one or more nodes available on the swarm.

In another implementation, the swarm creation module is configured to create the swarm of the one or more nodes. The swarm creation module includes a processing module. The processing module is configured to compute the nodes properties of the one or more nodes, generate a string for each of the computed nodes properties of the nodes, broadcast the generated string for the nodes on the swarm, and join the swarm by one of the nodes after receiving a response from a swarm manager in a predefined time.

In another implementation, the processing module is configured to initialize the swarm manager by one of the nodes after the response from one of the nodes is failed and wait for other nodes to join the swarm.

In another implementation, the swarm creation module is configured to create a swarm of one or more nodes in the network using at least one of ant colony optimization, flocking, or particle swarm optimization technique.

In another embodiment, a method for healing a faulty node in a network includes an operation of storing, in a database, pre-defined attributes related to nodes, nodes properties of the nodes, and pre-determined healing profiles. The method includes an operation of creating, by a swarm creation module, a swarm of one or more nodes in the network based on the stored properties of the nodes. The method includes an operation of computing, by a computation module, a fitness value of each of the nodes based on the pre-defined attributes of each of the nodes on the swarm. The method includes an operation of detecting, by a detection module, an anomaly of at least one node based on the fitness value using a swarm based logic technique. The method includes an operation of identifying, by the detection module, the faulty node based on the detected anomaly. The method includes an operation of identifying, by an identification module, a control mechanism based on a healing profile. The method includes an operation of transmitting, by the identification module, the identified control mechanism to the identified faulty node to other nodes on the swarm using machine learning techniques or learning correction patterns. The method includes an operation of correcting, by a correction module, the faulty node by applying the control mechanism to the faulty node on the swarm.

In another embodiment, an automated system for healing a faulty node in a network includes a memory, a processor, a database, a swarm creation module, a computation module, a detection module, an identification module, and a correction module. The memory is configured to store pre-defined rules. The processor is configured to generate system processing commands based on the pre-defined rules. The database is configured to store pre-defined attributes related to nodes, nodes properties of the nodes, and pre-determined healing profiles. The swarm creation module is configured to create a swarm of one or more nodes in the network based on the stored properties of the nodes. The computation module is configured to compute a fitness value of each of the nodes based on the pre-defined attributes of each of the nodes on the swarm. The detection module is configured to detect an anomaly of at least one node based on the fitness value using a swarm based logic technique, and identify the faulty node based on the detected anomaly. The identification module is configured to identify a control mechanism based on a healing profile, and transmit the identified control mechanism to the identified faulty node to other nodes on the swarm using machine learning techniques or learning correction patterns. The correction module is configured to correct the faulty node by applying the control mechanism to the faulty node on the swarm.

It should be noted that the description merely illustrates the principles of the disclosure. It will thus be appreciated that those skilled in the art will be able to devise various arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

FIG. 1 illustrates a block diagram depicting an automated system for healing a faulty node in a network, according to an embodiment of the disclosure.

An automated system for healing a faulty node in a network (100) (hereinafter referred to as "system" includes a memory (102), a processor (104), a database (106), a swarm creation module (108), a computation module (112), a detection module (114), an identification module (118), and a correction module (120).

The memory (102) is configured to store pre-determined rules related to identification of nodes, detection of faulty nodes, determination of technical issues, and healing of faulty nodes. The memory (102) is also configured to store network related data. In an embodiment, the memory (102) can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory (102) also includes a cache memory to work with the system (100) more effectively.

The processor (104) is configured to cooperate with the memory (102) to receive the pre-determined rules. The processor (104) is further configured to generate system processing commands. In an embodiment, the processor (104) may be implemented as one or more microprocessors, microcomputers, microcontrollers, digital signal processors, central processing units, state machines, logic circuitries, and/or any devices that manipulate signals based on operational instructions. Among other capabilities, the at least one processor (104) is configured to fetch the pre-determined rules from the memory (102) and execute different modules of the system (100).

The database (106) is configured to store pre-defined attributes related to nodes, node properties of the nodes, and pre-determined healing profiles. In an embodiment, the database (106) can be implemented as, but is not limited to, an enterprise database, a remote database, a local database, and the like. In one embodiment, the database (106) may themselves be located either within the vicinity of each other or may be located at different geographic locations. In another embodiment, the database (106) can be implemented inside or outside the system (100) and the database (106) can be implemented as a single database.

In an embodiment, the node properties of each node include information related to a node type, a node identification number (ID), neighbor nodes, Internet Protocol (IP) address, hardware, schedule data, and firmware data including a product family, version details, and function sets. In an embodiment the node properties are pre-defined and stored in the database (106). In another embodiment, the pre-defined attributes include CPU (Central Processing Unit) usage, resource utilization, available memory, connection status, black screen, standby mode, response time, picture properties, on screen display, audio, broadcasting, network, and other system attributes including accessibility, power control, and the like. In another embodiment, each healing profile includes a set of commands or signals to heal the node from the state of faulty node. In an embodiment, Table 1 illustrates the nodes properties:

TABLE 1

| Main Property | Sub-Category-1 | Sub-Category-2 | Sub-Category-3 |
|---|---|---|---|
| Picture | Picture Mode | Backlight | |
| | | Contrast | |
| | | Brightness | |
| | | Sharpness | |
| | | Color | |
| | | Tint | |
| | Color Temperature | | |
| | White Balance | | |
| | Gamma | BT.1886 | |
| | Calibrated Value | | |
| | Advanced Settings | Contrast Enhancer | |
| | | Black Tone | |
| | | Flesh Tone | |
| | | RGB Only Mode | |
| | | Color Space Settings | |
| | | Motion Lighting | |
| | | HDR + Mode | |
| | Picture Options | Color Tone | |
| | | Digital Clean View | |
| | | HDMI Black Level | |
| | | Film Mode | |
| | | Dynamic Blacklight | |
| | Picture Size Settings | | |
| | Reset Picture | | |
| On Screen Display | PIP | Source | |
| | | Aerial | |
| | | Channel | |
| | | Size | |
| | | Position | |
| | | Sound Source | |
| | Display Orientation | Menu Orientation | |
| | | Content Orientation | |
| | | Aspect Ratio | |
| | Screen Protection | Auto Protection Time | |
| | | Screen Burn Protection | |
| | Messenger Display | Source Info | |
| | | No Signal Message | |
| | | MDC Message | |
| | | Download Status Message | |
| | Language | | |
| | Reset Onscreen Display | | |
| Sound | Sound Mode | | |
| | Balance | | |
| | Equalizer | | |
| | HDMI Sound | | |
| | Sound on Video Call | | |
| | Sound Output | | |
| | Auto volume | | |
| | Reset Sound | | |
| Broadcasting | Auto tuning | | |
| Network | Network Status | | |
| | Network Settings | | |
| | Server Settings | Connect To Server | Server Address |
| | | | TLS |
| | | | Port |

TABLE 1-continued

| Main Property | Sub-Category-1 | Sub-Category-2 | Sub-Category-3 |
|---|---|---|---|
| System | | Magic Info Mode | |
| | | Server Access | |
| | | FTP Mode | |
| | | Proxy Server | |
| | Device Name | | |
| | Accessibility | High Contrast | |
| | | Enlarge | |
| | Touch Control | | |
| | Time | Clock | |
| | | NTP Settings | |
| | | DST | |
| | | Power On Delay | |
| | Auto Source Switching | Auto Source Switching | |
| | | Primary Source Recovery | |
| | | Primary Source | |
| | | Secondary Source | |
| | Power Control | Auto Power ON | |
| | | PC Module Power | |
| | | Max. Power Saving | |
| | | Standby Control | |
| | | Network Standby | |
| | | Power Button | |
| | Eco Solution | Energy Saving Mode | |
| | | Eco Sensor | |
| | | Screen Lamp Schedule | |
| | | No Signal Power OFF | |
| | | Auto Power OFF | |
| | Temperature Control | | |
| | Play Via | | |
| | General | Smart Security | SCAN |
| | | | Isolated List |
| | | Any net + (HDMI-CEC) | |
| | | HDMI Hot Plug | |
| | | Custom Log | |
| | | Game Mode | |
| | | Empty Storage | |

The swarm creation module (108) is configured to create a swarm of one or more nodes in the network based on the stored properties of the nodes in the database (106). In an embodiment, the swarm creation module (108) is configured to create the swarm of the one or more nodes. The swarm creation module (108) includes a processing module (110). The processing module (110) is configured to compute the nodes properties of the one or more nodes. Subsequently, the processing module (110) is configured to generate a string for each of the computed nodes properties of the nodes, and broadcast the string for the nodes on the swarm. Thereafter, one of the nodes join the swarm after receiving a response from a swarm manager in a predefined time. In an embodiment, upon receiving the response from the swarm manager in the predefined time, one of the plurality of nodes will join the swarm, and if the response from any one of the plurality of nodes is failed, the swarm manager is initialized, and waits for other plurality of nodes to join the swarm. In an embodiment, the swarm creation module (108) is configured to create a swarm of one or more nodes in the network using at least one of ant colony optimization, flocking, or particle swarm optimization technique. The 'swarm' of one or more nodes in the network referred to in the specification of the disclosure may be referred to interchangeably as a 'group'.

In an embodiment, the nodes include electronic devices, such as video-walls, television, smart TVs, and any type of display screens.

The computation module (112) is configured to cooperate with the swarm creation module (108) and the database (106). A processor may control to store data (e.g., first data, second data) related to electronic devices on the formed swarm in a database. The first data may include attributes of the nodes (e.g., the electronic devices on the swarm (group)), pre-determined nodes properties of the nodes, and fitness values of the pre-defined attributes. The second data may include pre-determined healing profiles and pre-determined control mechanism. A third data of electronic devices in a swarm would correspond to the calculated value of the attributes based on the first data. In an embodiment, the node properties of each node include information related to a node type, a node identification number (ID), neighbor nodes, Internet Protocol (IP) address, hardware, schedule data, and firmware data including a product family, version details, and function sets. In an embodiment the node properties are pre-defined and stored in the database (106). In another embodiment, the pre-defined attributes include CPU (Central Processing Unit) usage, resource utilization, available memory, connection status, black screen, standby mode, response time, picture properties, on screen display, audio, broadcasting, network, and other system attributes including accessibility, power control, and the like. In another embodiment, each healing profile includes a set of commands or signals to heal the node from the state of faulty node. The computation module (112) is configured to compute a fitness value of each of the nodes of the nodes based on the pre-defined attributes of each of the nodes on the created swarm.

In an embodiment, the system (100) includes a broadcasting module (122). The broadcasting module (122) is configured to cooperate with the computation module (112) and the database (106). The broadcasting module (122) is configured to broadcast the fitness value to each of the nodes to other nodes on the swarm. In an embodiment, each of the nodes include its own fitness value and other nodes fitness values.

The detection module (114) is configured to cooperate with the computation module (112) to receive the fitness value of each of the nodes. A processor may select an agent node (e.g. agent electronic device on the formed swarm) among nodes on the swarm. The computation module may calculate third data such as value of the attributes based on the first data. The processor may be configured to compare the third data with the first data based on the electronic devices on the swarm. The detection module (114) is configured to detect an anomaly of at least one node based on the fitness value using a swarm based logic technique, and is further configured to identify the faulty node based on the detected anomaly. In an embodiment, the swarm based logic technique includes a majority logic technique, a predictive behavior technique, a relative logic technique, or any combinations thereof. In another embodiment, the detection module (114) is configured to detect the faulty node whose fitness value is not equal to the majority value of the one or more healthy nodes, where the majority value is identified by the majority logic technique. In another embodiment, the majority logic technique includes a collective decision of one or more healthy nodes to handle the faulty node failures on the swarm.

In an embodiment, the detection module (114) includes a comparator (116). The comparator (116) is configured to compare the fitness value of each node with other nodes to detect the anomaly of at least one node based on the pre-defined attributes using the swarm based logic technique, and identify the faulty node based on the detected anomaly.

The identification module (118) is configured to cooperate with the detection module (114) and the database (106) to receive the identified faulty node and the stored healing profile. The identification module (118) is further configured to identify a control mechanism based on the stored healing profile, and transmit the identified control mechanism to the identified faulty node. The control mechanism includes a control mess. In an embodiment, the identification module (118) is configured to determine the healing profile based on at least one detection, correction, and prediction of the anomaly. In another embodiment, the identification module (118) is configured to transmit the identified control mechanism to the identified faulty node on the swarm based on the healing profile, by using machine learning techniques, or learning correction patterns. In one embodiment, the identification module (118) is configured to identify the control mechanism based on the healing profile of the identified faulty node.

In an embodiment, the system (100) includes an updater (124). The updater (124) is configured to update the healing profile of the one or more nodes of the swarm, by using learning correction patterns. In another embodiment, the updater (124) is configured to update the healing profile of a plurality of nodes of other swarm with the updated healing profile of the one or more nodes of the swarm, by using learning correction patterns. In an embodiment, the one or more swarms are connected together over a network (not shown in a figure). In another embodiment, the network interconnects the plurality of swarms. The network includes wired or wireless networks. Examples of the wired networks include, but are not limited to, a Wide Area Network (WAN) or a Local Area Network (LAN), a client-server network, a peer-to-peer network, and so forth. Examples of the wireless networks include, but are not limited to, Wi-Fi, a Global System for Mobile communications (GSM) network, and a general Packet Radio Service (CPRS) network, an enhanced data GSM environment (EDGE) network, 802.5 communication networks, Code Division Multiple Access (CDMA) networks, cloud, or Bluetooth networks.

The correction module (120) is configured to cooperate with the identification module (118) to receive the identified control mechanism. The correction module (120) is configured to correct the faulty node by applying the control mechanism to the faulty node on the swarm. In an embodiment, any node from the one or more nodes on the swarm is configured to transmit the control mechanism to the faulty node to bring the faulty node in the normal state. In another embodiment, the one or more nodes which transmit the control mechanism to the faulty device is an agent node. In another embodiment, the agent node is configured to send the control signals to the faulty device. In an embodiment, the swarm creation module (108) is configured to randomly select an agent node from the one or more nodes available on the swarm.

In an embodiment, the system (100) is configured to divide the swarm into a plurality of sub-swarms in a dynamic manner, based on a load balancing mechanism. The system (100) is further configured to divide the swarm into a plurality of sub-swarms is based on a detection of anomaly in the swarm.

Figure 2:
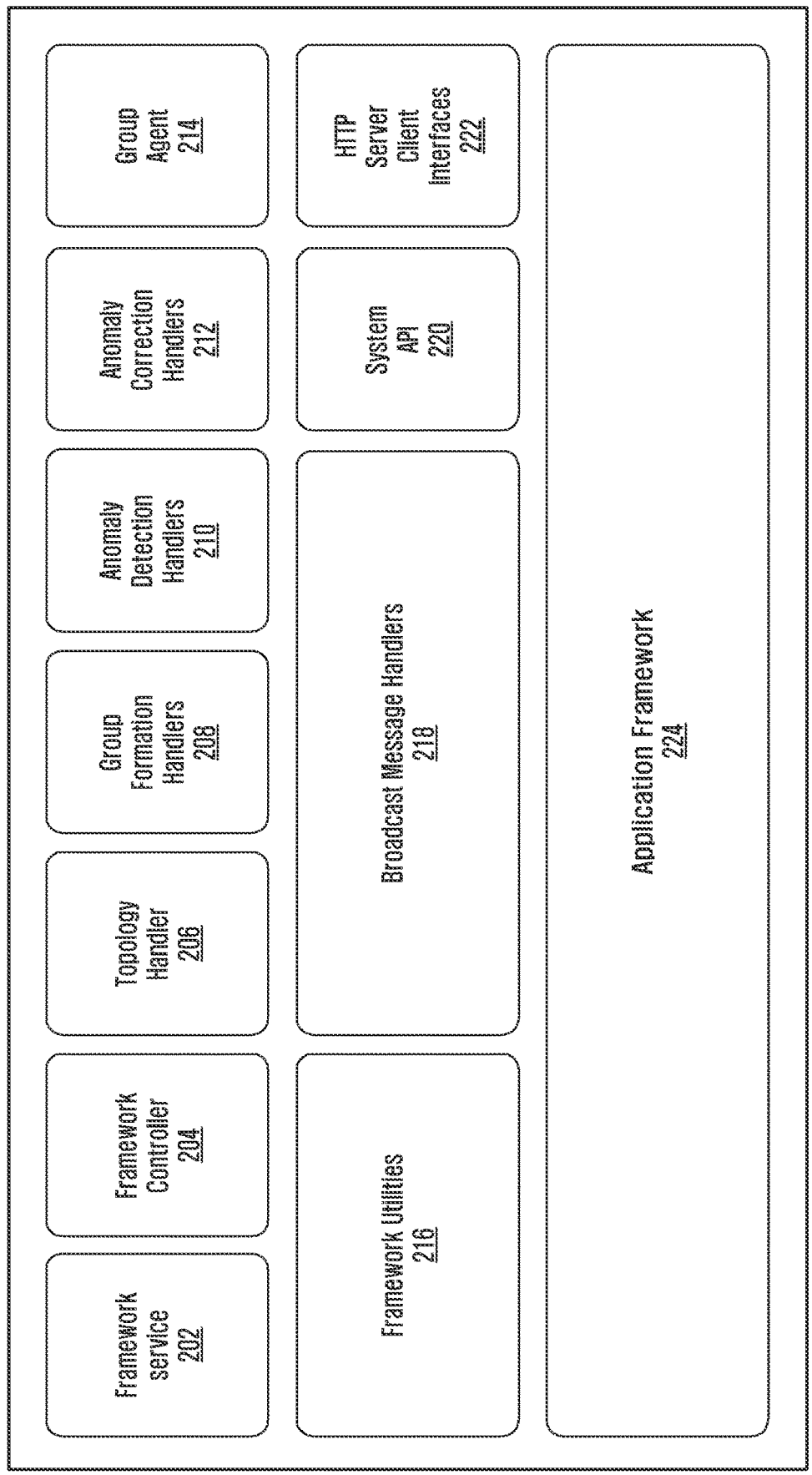
FIG. 2 illustrates a schematic diagram depicting an architecture (200) of a swarm framework for healing a faulty node in a network, according to an embodiment of the disclosure.

FIG. 2 illustrates a schematic diagram depicting an architecture (200) of a swarm framework for healing a faulty node in a network, according to an embodiment of the disclosure.

The architecture (200) of a swarm framework includes an application framework (224). The application framework (224) having different modules and sub-modules on layers, such as a framework service (202), a framework controller (204), a topology handler (206), group formation handlers (208), anomaly detection handlers (210), anomaly correction handlers (212), a group agent (211), framework utilities (216), broadcast message handlers (218), a system API (220), and HTTP server client interfaces (222).

The application framework (224) is configured to apply a control mechanism to a faulty node on a swarm. Specifically, the application framework (224) provides anomaly detection handlers (210), and anomaly correction handlers (212) to apply the control mechanism to the faulty node on the swarm.

The framework service (202) is a communication point to exterior applications. Any exterior applications can dynamically configure the swarm framework using the framework service (202). The framework controller (204) is configured to control whole architecture (200). The framework controller (204) is configured to start and stop all the handlers (206, 208, 210, 212, 218) and the group agent (214). The framework controller (204) is further configured to change the detection and correction handlers (210, 212) depending upon application requests. The topology handler (206) is configured to discover all the nodes or devices on the network and share across the swarm framework. The topology handler (206) is further configured to dynamically add/delete nodes from the swarm framework while the swarm framework is running. The group formation handlers (208) is configured to define techniques, which are used for forming groups of one or more nodes. For example, K-Means can be used to split N nodes/devices into K groups based on their configuration/properties. The anomaly detection handlers (212) are configured to define techniques, which are used for detecting the anomaly. For example, Moving Averages can be used for detecting the anomaly in CPU. The anomaly correction handlers (212) are configured to define methods for correcting the detected anomaly. In this, the correction methods can be simple as restarting the node/device or giving a network control command. The group agent (214) is configured to define techniques for electing the group agent for a swarm group. The group agent (214) is used to communicate across the swarms. In an embodiment, the group agent (214) is used for communicating with User Interface (UI) and other swarm groups. The framework utilities (216) consists of general utilities required by the swarm framework. The general utilities include message queues, shared memory, etc. In an embodiment, the framework service (202) and the framework controller (204) use the framework utilities (216). The broadcast message handlers (218) includes interfaces which send and receive broadcast messages. In an embodiment, the broadcast message handlers (218) include the topology handler (206), the group formation handlers (208), and the anomaly detection handlers (210). These handlers (206, 208, 210) use the broadcast message handlers (218) to communicate among themselves efficiently. The system API (Application Programming Interface) (220) includes interfaces to Get/Set system parameters, such as CPU, memory, source, etc. In an embodiment, the anomaly detection handlers (210) and the anomaly correction handlers (212) use the system API (220) to achieve the desired functionalities. The HTTP (Hypertext Transfer Protocol) server client interfaces (222) are configured to create an HTTP server, and client can be provided by the HTTP server client interfaces (222). In an embodiment, the HTTP server client interfaces (222) are used by the group agent (214) for communicating across one or more swarms.

Figure 3:
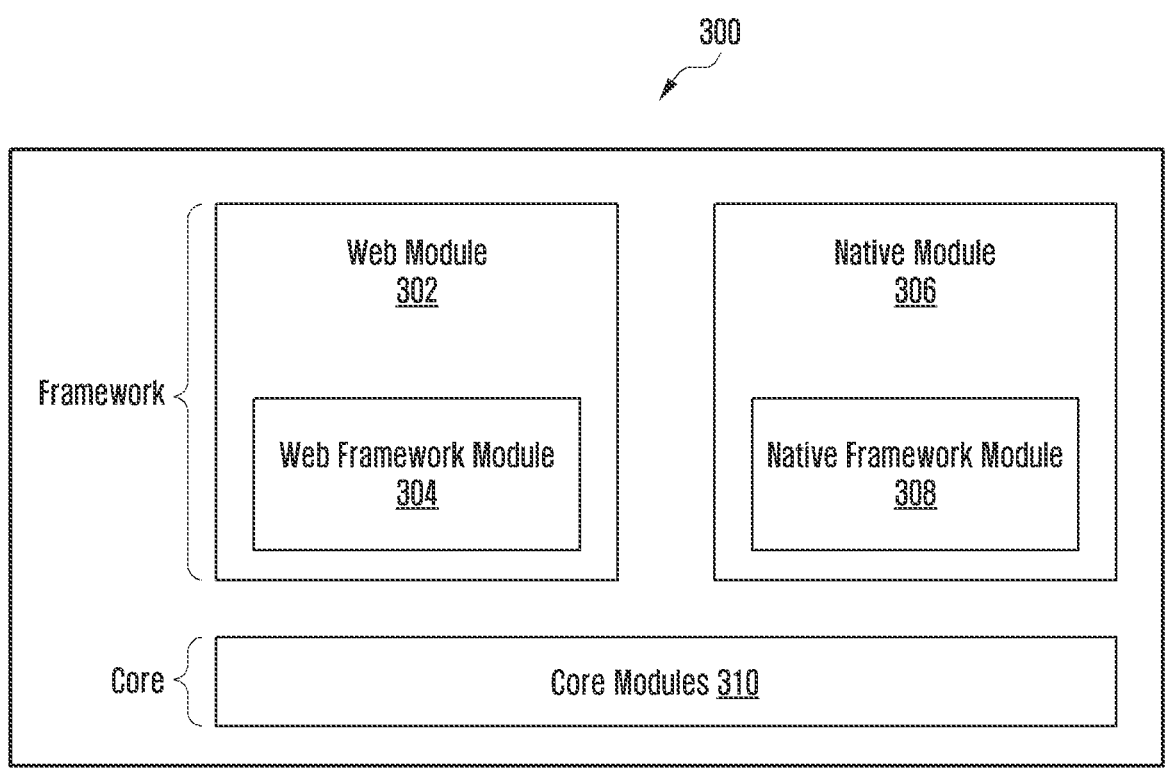
FIG. 3 illustrates a schematic diagram depicting modules for performing fitness functions, according to an embodiment of the disclosure.

FIG. 3 illustrates a schematic diagram (300) depicting modules for performing fitness functions, according to an embodiment of disclosure.

A web module (302), a native module (306), and core modules (308) are configured to perform fitness functions for providing the health status of the nodes in the swarm which is based on attributes, such as CPU usage, resource utilization, available memory, connectivity, and the like. In this, a layer of an interface is implemented which communicates with the core modules (310) and get its status as a health factor. In an embodiment, the core modules (310) are based on, but are not limited to, Application Framework, Graphics/User Interface, Location, Multimedia, Messaging, Web, Security, System, Base, Connectivity, Telephony, and PIM (Product Information Management). In an embodiment, the modules are arranged in two layers, i.e. at a core layer and a framework layer. In another embodiment, the layer of the interface includes a web module (302) and a native module (306). The web module (302) includes a web framework module (304). The web framework module (304) includes various modules for example, W3C/HTML5 (World Wide Web Consortium/Hypertext Markup Language 5), Device APIs, Web UI F/W (Web User Interface Framework), and Web Runtime. In an embodiment, the web framework module (304) is used in a web application. The native framework module (308), includes various modules, for example Application, Graphics/User Interface (UI), Social, Messaging, Base/IO, User Interaction XML (Uix), Media, Telephony, Security, Web/Extensible Markup Language (XML), Content, Net, System, Shell, Text/Locates, and a health metric. In an embodiment, health metric defines health observations of each nodes. In another embodiment, the native framework module (308) is used in a native application. In an embodiment, the native application has APIs to identify health of nodes. The APIs include GetLive-Connect( ) for identifying connectivity, GetCPU( ) for identifying CPU utilization, and GetMemory( ) for identifying available memory.

Figure 4:
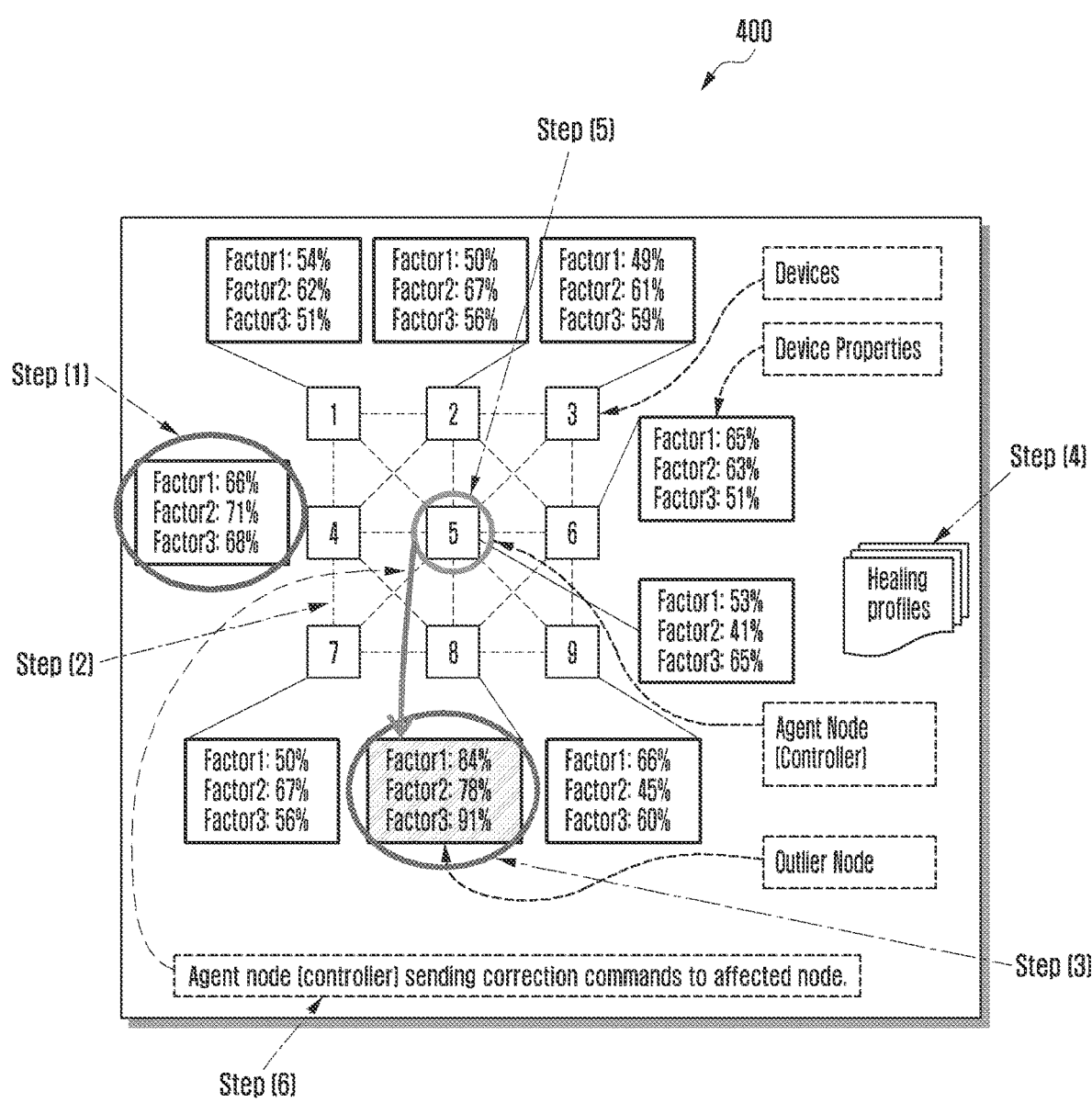
FIG. 4 illustrates a schematic diagram depicting healing a faulty node using a majority logic in a swarm network, according to an embodiment of the disclosure.

FIG. 4 illustrates a schematic diagram (400) depicting healing a faulty node using a majority logic in a swarm network, according to an embodiment of the disclosure.

Referring to FIG. 4, the system (100) is configured to heal a faulty node using a majority logic in a swarm network. In this, a swarm creation module (108) is configured to create a swarm of one or more nodes based on the node's properties, for example, a swarm of 9 display devices, as shown in FIG. 4. All the display devices (i.e. 1, 2, 3, 4, 5, 6, 7, 8, 9) are interconnected with each other over a network (not shown in a figure). At a step (1), a computation module (112) is configured to compute a fitness value of each display device. The fitness value can be properties/factors, such as memory, CPU, and the like. For example, at the step (1), the fitness value of the display device (4) is computed, such as Factor1 (for example, memory): 66%, Factor2 (for example, CPU): 71%, and Factor3 (for example, connectivity): 68%. At a step (2), a broadcasting module (122) is configured to broadcast the fitness value of each display device to other interconnected display devices on the swarm. In an embodiment, each display device communicates with other display devices and shares the fitness values. For example, the display device (4) shares the fitness values to the display devices (1, 2, 5, 7, 8). At a step (3), every display device is having its own fitness values and other display devices fitness values. By simple, average out, a common trend is identified, and a device whose fitness values are far from common/majority trend is identified. In an embodiment, a detection module (114) is configured to detect an anomaly of at least one node/device based on the fitness value using a swarm based logic technique (for example, a majority logic technique), and identify the faulty node based on the detected anomaly. For example, the display device (5) has fitness value which are far from common/majority trend. Therefore, an outlier device (i.e. the display device 5) is identified. At a step (4), a healing profile for the display device (5) is selected. Using the control mechanism/outlier parameters, a suitable healing profile can be selected on the swarm. In an embodiment, an identification module (118) is configured to identify a control mechanism based on a healing profile stored in a database (106). At a step (5), any device (for example, display device 5) can send the correction operations/control mechanism to the affected device and to bring the affected device back to the normal state. The device which sends the healing message to the affected device is an agent node. For example, the display device (5) transmits the control mechanism (i.e. a healing message) to the faulty display device (8). In an embodiment, the identification module (118) is configured to transmit the identified control mechanism to the identified faulty node/device. At a step (6) the control mechanism (i.e. healing message) transmitted by the agent node (i.e. the display device (5)) to the faulty device (i.e. the display device (8)), is then applied to the faulty device. In an embodiment, the healing messages are the network message commands, which one device send to other devices. The simple healing message is to send reboot command in case of an application is crashed because of high memory. In one embodiment, a correction module (120) is configured to correct the faulty node/device by applying the control mechanism to the faulty node on the swarm.

Figure 5:
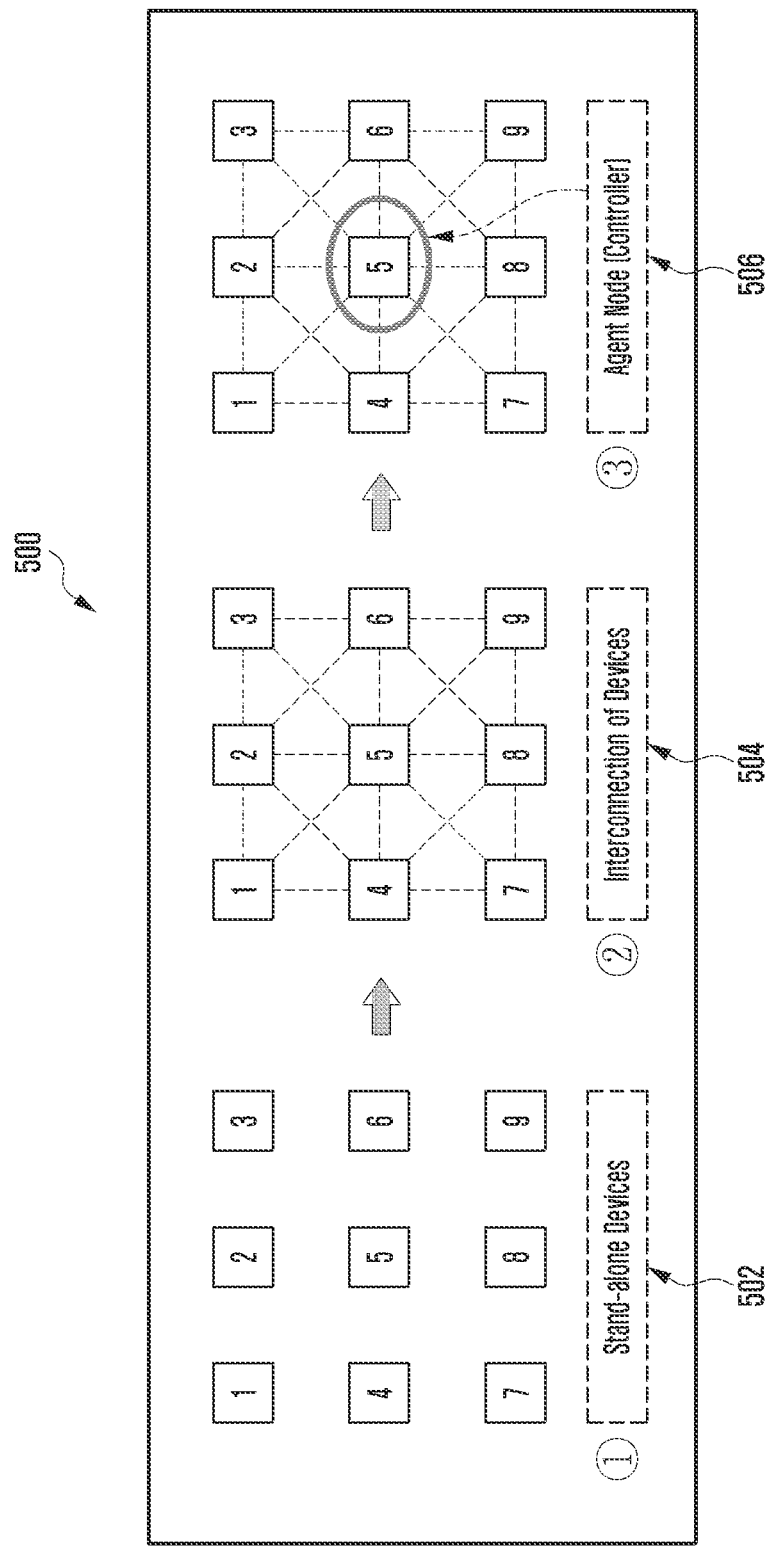
FIG. 5 illustrates a schematic diagram depicting a swarm creation, according to an embodiment of the disclosure.

FIG. 5 illustrates a schematic diagram (500) depicting a swarm creation, according to an embodiment of the disclosure.

In an embodiment, a swarm creation module (108) is configured to create a swarm of one or more nodes in the network based on the properties of the nodes. In an embodiment, the nodes are capable with each other using a communication medium, such as Bluetooth, Wi-Fi, LAN, and the like. When the system (100) gets turned on, the nodes form a swarm, and identify one agent, randomly. This is known as formation of a network group. The agent node can send the control signals and correct the faulty node on the swarm. In an embodiment, stand-alone devices (502) can create a swarm. For the creation of the swarm, the stand-alone devices (502) have to wait for connection availability. In an embodiment, swarm can be formed on any network topologies. At (504), the devices are interconnected with each other. The devices form a swarm, where each device can communicate with each other device within the group. In this, creation of the swarm can be manually basis, like similar kind of devices, nearby devices, devices having same software version, and the like. In another embodiment, the system (100) identifies an agent node, as shown in (506). The system (100) identifies the agent node (a controller) that can send the control signals to recover/heal the faulty device, when needed. Every device has a capability to correct the neighbor node. The agent node can be selected randomly among other available nodes. In an embodiment, a node which transmits control mechanism to the faulty node in the network, is an agent node. The agent node is a healthy node, which has a capability to heal the faulty node. In an embodiment, each nodes of the swarm have fitness values of other interconnected nodes. Each node communicates with other nodes and share the fitness values. By using a common trend, a node whose fitness values are far from common/majority trend is identified. The system (100) detects an anomaly of at least one node based on the fitness value using a swarm based logic technique (for example, a majority logic technique), and identify the faulty node based on the detected anomaly. A healing profile for the faulty node is selected. Using the control mechanism, a suitable healing profile can be selected on the swarm. Any node of the swarm can send the correction operations/control mechanism to the affected/faulty node and bring the faulty node back to the normal state. The node which send the healing message to the faulty device is an agent node. The control mechanism (i.e. healing message) transmitted by the agent node to the faulty device, is then applied to the faulty device.

Figure 6:
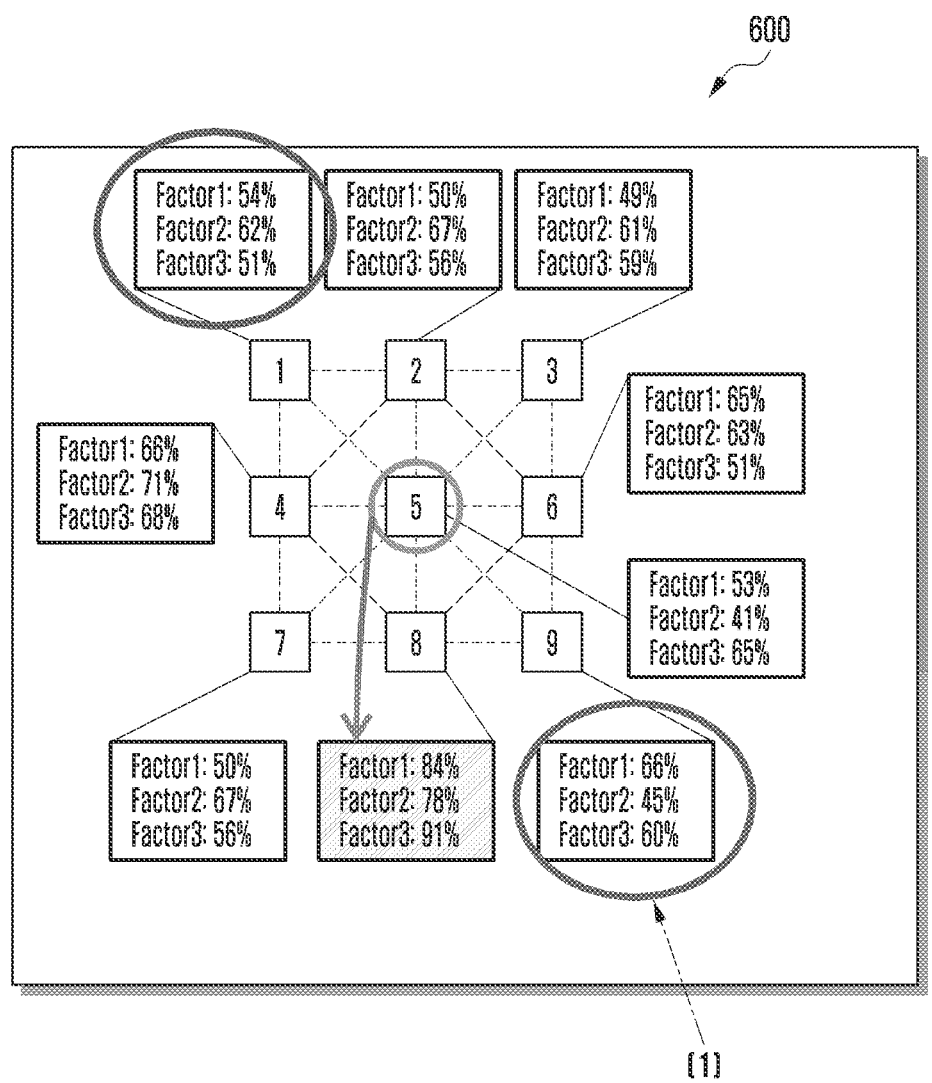
FIG. 6 illustrates a schematic diagram depicting sharing health status, according to an embodiment of the disclosure.

FIG. 6 illustrates a schematic diagram (600) depicting sharing health status, according to an embodiment of the disclosure.

Referring to FIG. 6, every device/node of the swarm shares/transmits the status of its own and also able to receive the information/status from the other devices. Every device is having a listener and sender to prepare a health record table, and store in the database (106). For example, at (1), the device (9) generates its fitness values and share to other devices.

Figure 7:
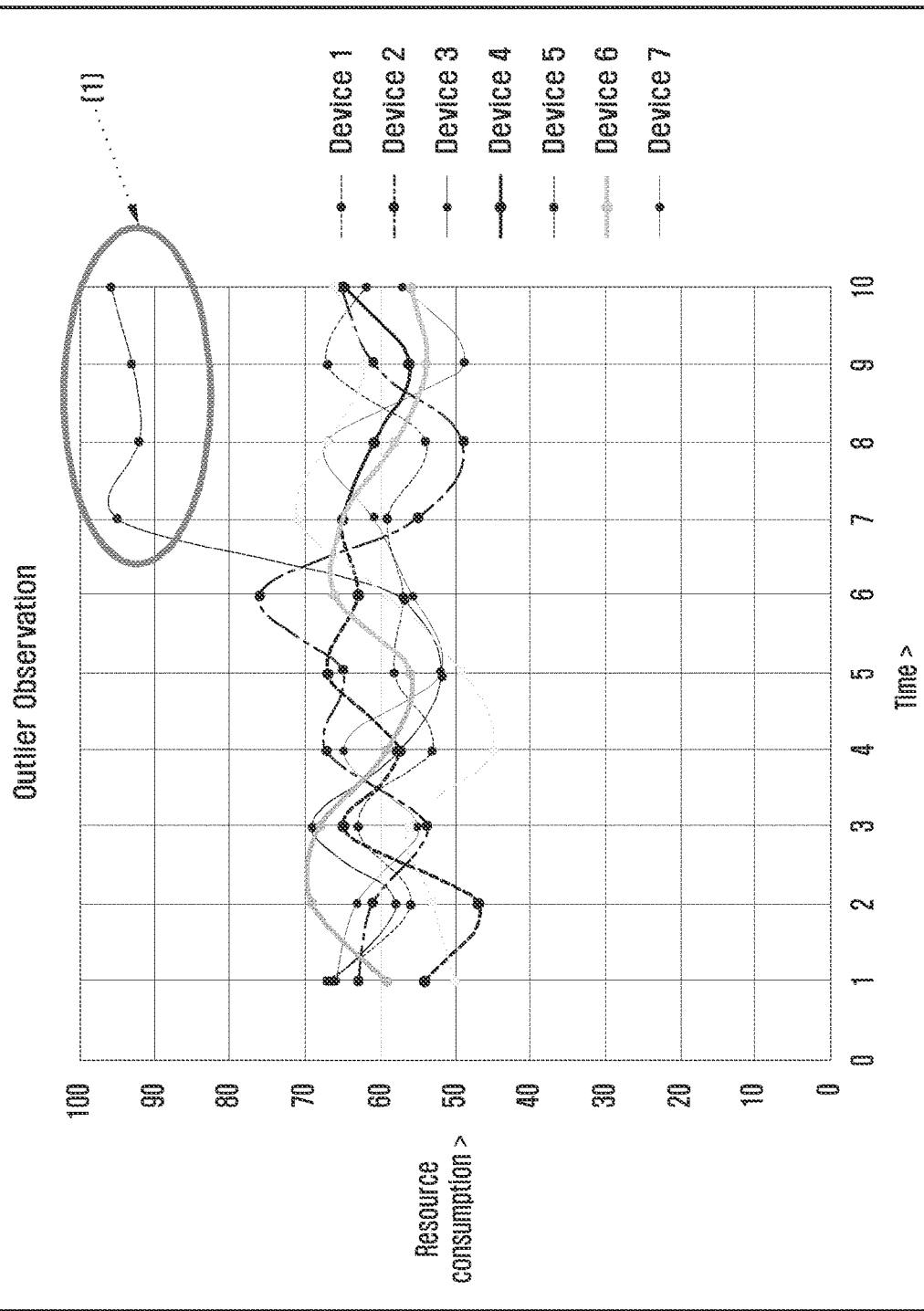
FIG. 7 illustrates a graphical representation depicting determination of an outlier, according to an embodiment of the disclosure.

FIG. 7 illustrates a graphical representation (700) depicting determination of an outlier, according to an embodiment of the disclosure.

Referring to FIG. 7, fitness values of the devices/nodes are compared with each other. The majority logic of the devices is identified, and find an outlier which is having different values for health attributes. At (1), the health attributes of the outlier are going beyond the common trend.

Figure 8:
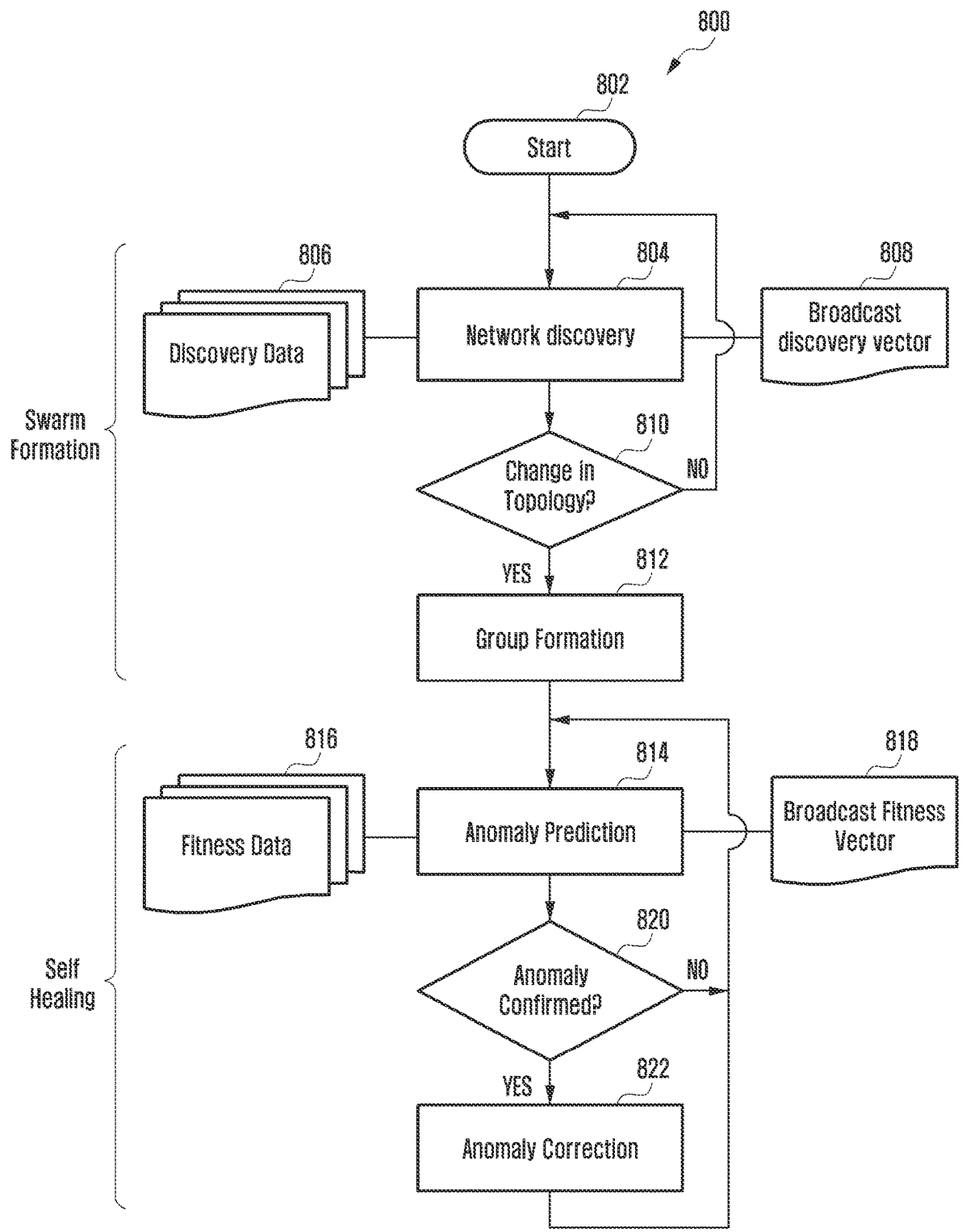
FIG. 8 illustrates a high level flow diagram depicting creation of swarm and healing a faulty node, according to an embodiment of the disclosure.

FIG. 8 illustrates a high level flow diagram (800) depicting creation of swarm and healing a faulty node, according to an embodiment of the disclosure.

The flow diagram (800) starts from an operation 802. At operation 804, a network having a plurality of nodes are discovered using discover data (as shown in a block (806), and broadcast discovery vector (808). In an embodiment, the system (100) is configured to discover the data from other nodes to create a swarm. The discovered data includes MAC address <MAC-ID> and IP address <IP>, for example, discovery data from other nodes in the swarm network.

fe:5b:d9:8e:e7:48;107.109.204.203;
fe:5c:d8:8b:e7:34;107.109.204.202;
ea:3b:s9:8e:e7:48;107.109.204.201;
fe:2b:12:8e:ea:61;107.109.204.204;
fe:4v:76:8e ev: 98; 107.109.204.205;
fe:6mj8:8e:ez:34;107.109.204.206;

In an embodiment, the discovery data consists of information that is used to form the groups in a swarm network. For broadcast the discovery vector, MAC address <MAC-ID>, IP address <IP>, model type <MODEL-TYPE>, and schedule <SCHEDULE> of each node are broadcasted, for example, discovery data would be consisting of information that could be used in forming the groups in the swarm network, which includes <MA C-ID>; <IP>; <MODEL-TYPE>; <SCHEDULE>; i.e.

fe:5b:d9:8e:e7:48;107.109.204.203;
T-KTM2ELAKUC;
b6444ea.9-5db3-4118-7e0d-2cd.157b4fbd1.

Further, at operation 810, the system (100) checks whether there is any change in topology of the network. If the topology is not changed, the system (100) forms a group at operation 812, else goes to at operation 802 and re-start the process. After forming the group, the system (100) predicts anomaly, as shown in operation 814, for healing the faulty node. The anomaly is predicted by fitness data (as shown in operation 816, and a broadcast fitness vector (as shown in operation 818. The fitness data includes fitness value of each device/nodes which are shared between one or more devices, for example fitness data from other nodes in the swarm network includes:

fe:5b:d9:8e:e7:48; 23;01;41;40;0
fe:5c:d8:8b:e7:34; 25;01;41;39;0
ea:3b:s9:8e:e7:48;21;01;42;38;0
fe:2b:12:8e:ea:61; 26;01;47;39;0
fe:4v:76:8e:ev:98; 28;01;43;41;0
fe:6m:j8:8e:ez:34; 20;01;40;42;0.

The fitness vector is used to monitor the device health. Depending on the number of the attributes, the vector size grow, for example the format <MAC>, <CPU>, <SRC>, <MEM>, <TEMP>, <STANDBY>, i.e. fe:5b:d9:8e:e7:48; 23;01;45;45;0. After predicting the anomaly, the system (100) checks whether the anomaly is confirmed, as shown in operation 820. If the anomaly is confirmed the system (100) corrects the anomaly, as shown in operation 822. If the anomaly is not correct, the system (100) again performs the prediction operation.

Figure 9:
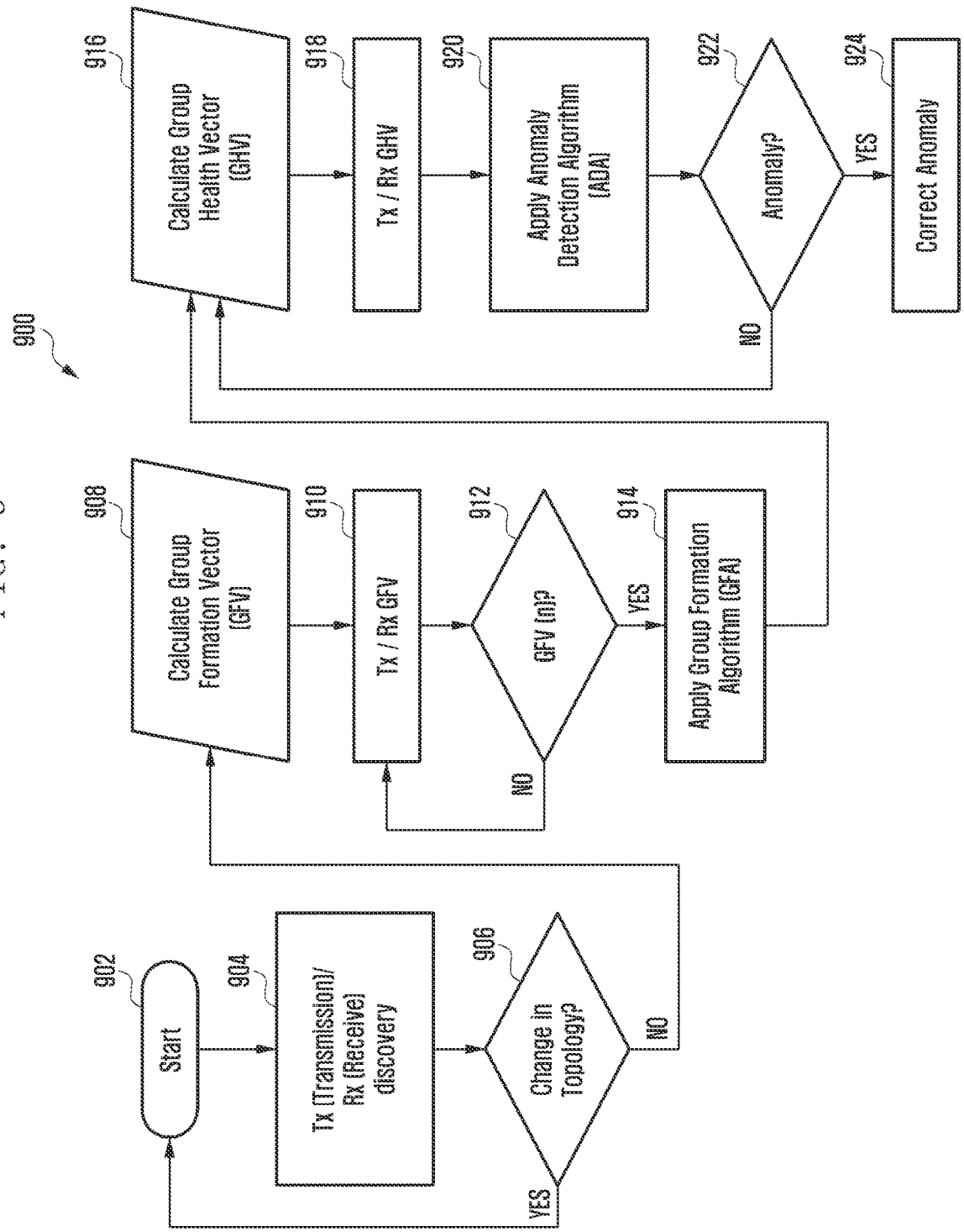
FIG. 9 illustrates a detail level flow diagram depicting applying healing to a faulty node, according an embodiment of the disclosure.

FIG. 9 illustrates a detail level flow diagram (900) depicting applying healing to a faulty node, according to an embodiment of the disclosure.

The flow diagram (900) starts at operation 902. At operation 904, discovery data (i.e. Tx (Transmission)/Rx (Receive) data) is used to detect devices on a network, for example, in a format <MAC> <IP> (e.g.: fe:5b: d9:8e:e7:48; 107.109.204.203). At operation 906, the system (100) checks whether there is any change in a topology or not. If the topology is changed, the system (100) restarts the process from (902). If the topology is not changed, the system (100) calculates Group Formation Vector (GFV) at operation 908. The Group Formation Vector (GFV) is information that is required by group formation algorithm to form groups for the nodes discovered in a swarm network, for example: <MAC-ID>, <PING>; <MODEL-TYPE>; <SCHEDULE> (fe:5b:d9:8e:e7:48, T-KTM2ELAKUC; b6444ea9-5db3-41f8-7e0d-2cd157b4fbd1). The system (100) then transmit/receive (Tx/Rx) the GFV to/from the nodes, as shown in operation 910. The system (100) checks GFV(n), where n is a number of nodes, as shown in operation 912. If GFV(n) is correct, apply Group Formation Algorithm (GFA) at operation 914, else repeat the operation 910. In an embodiment, the GFA is the formation algorithm that is used to form groups, such as stand alone nodes group, an agent node group, devices having similar functionalities, etc. By applying the group formation algorithm (GFA), the system (100) calculates Group Health Vector (GHV), as shown in operation 916. The system (100) then transmit/receive (Tx/Rx) the GHV to/from nodes, as shown in Operation 918. At operation 920, apply Anomaly Detection Algorithm (ADA). In an embodiment, algorithms that is be used to detect abnormalities, for example Moving Averages for calculating average CPU usage, K-Means Clustering algorithms used for Anomaly groups, and the like. The system then again checks whether anomaly is detected at operation 922. If the anomaly is not detected, the system restarts the process from the operation 916. If the anomaly is detected, the system corrects the anomaly, as shown in operation 924.

Figure 10:
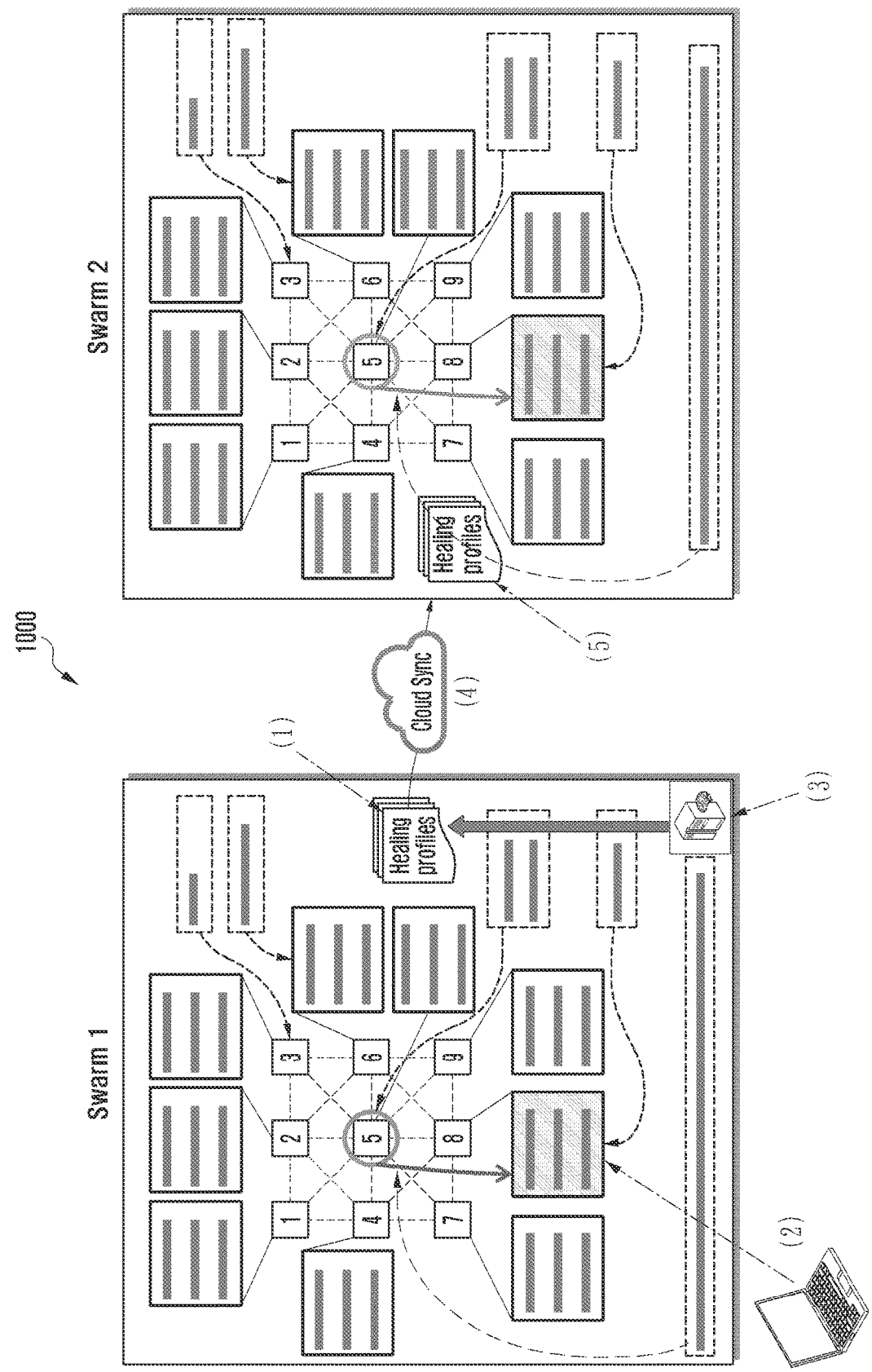
FIG. 10 illustrates a schematic diagram depicting machine learning techniques for updating the healing profiles on a remote swarm groups, according to an embodiment of the disclosure.

FIG. 10 illustrates a schematic diagram (1000) depicting machine learning techniques for updating the healing profiles on a remote swarm groups, according to an embodiment of the disclosure.

Referring to FIG. 10, the system (100) uses machine learning techniques to update the healing profile on remote swarm groups. For example, there are two swarms, i.e. Swarm 1 and Swarm 2. At (1), the system (100) uses the majority logic to identify the faulty node, but there is no healing profile available on Swarm1 to heal it. At (2), the system (100) sends a healing message to the faulty node via an outside node. This is a manual event which sent the healing message to the faulty device. At (3), the system (100) learns when healing message will be sent and update the local healing profile in the database (106). At (4), by using a cloud synchronization, the system (100) updates the healing profiles to related remote swarm groups as an outcome of the self-learning. At (5), for similar fault on Swarm 2, it is already having the updated healing profile to handle the fault. This knowledge is obtained from learning mechanism on swarm groups. In an embodiment, Swarm 2 can learn and share the healing profile newly learned element of the Swarm 1.

Figure 11:
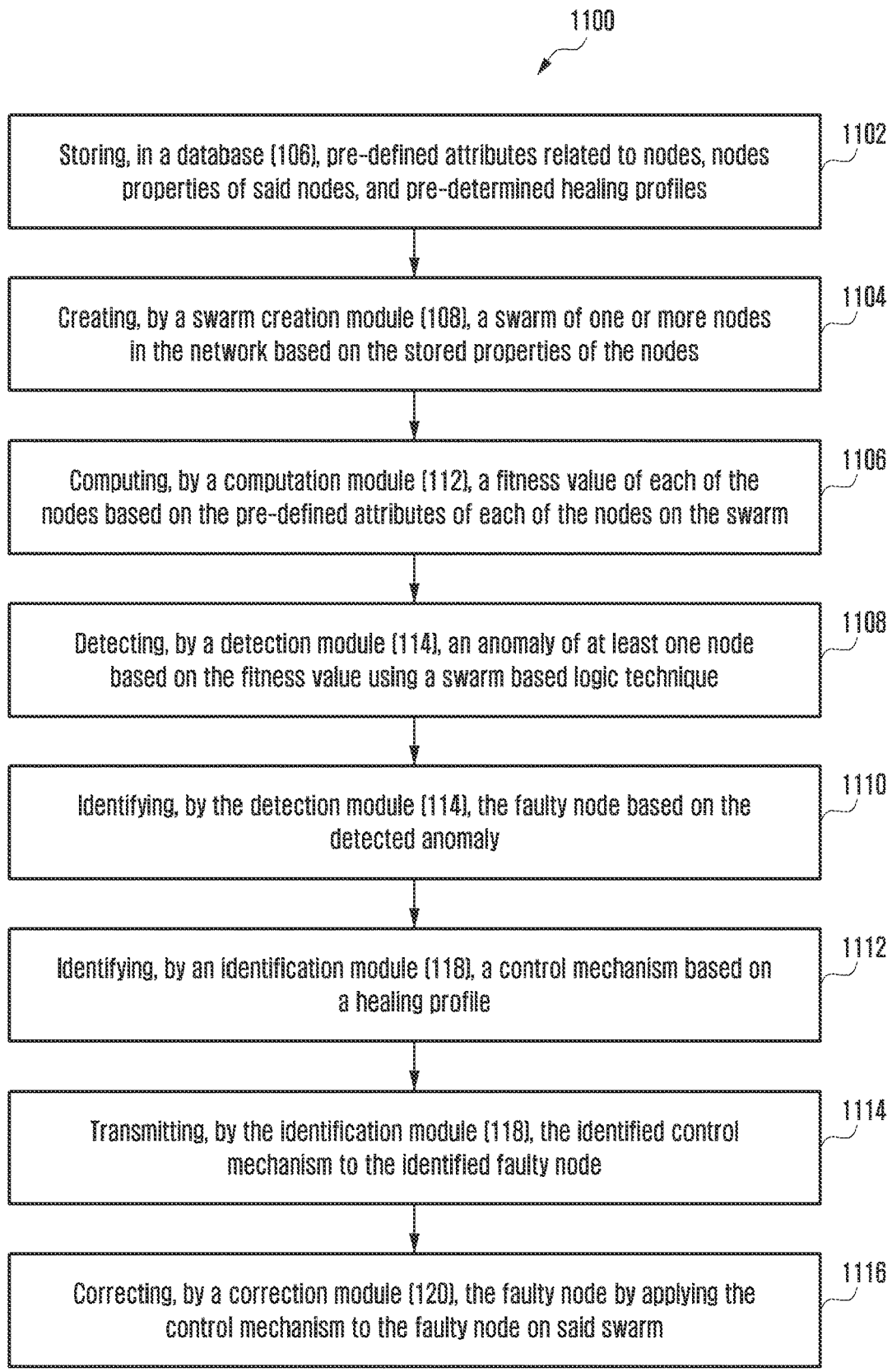
FIG. 11 illustrates a flowchart depicting a method for healing a faulty node in a network, according an embodiment of the disclosure.

FIG. 11 illustrates a flowchart (1100) depicting a method for healing a faulty node in a network, according to an embodiment of the disclosure.

The flowchart (100) starts at operation 1102, storing, in a database (106), pre-defined attributes related to nodes, nodes properties of the nodes, and pre-determined healing profiles. In an embodiment, a database (106) is configured to store pre-defined attributes related to nodes, nodes properties of the nodes, and pre-determined healing profiles. At operation 1104, creating, by a swarm creation module (108), a swarm of one or more nodes in the network based on the stored properties of the nodes. In an embodiment, a swarm creation module (108) is configured to create a swarm of one or more nodes in the network based on the stored properties of the nodes. At operation 1106, computing, by a computation module (112), a fitness value of each of the nodes based on the pre-defined attributes of each of the nodes on the swarm.

In an embodiment, a computation module (112) is configured to compute a fitness value of each of the nodes based on the pre-defined attributes of each of the nodes on the swarm. At operation 1108, detecting, by a detection module (114), an anomaly of at least one node based on the fitness value using a swarm based logic technique. In an embodiment, a detection module (111) is configured to detect an anomaly of at least one node based on the fitness value using a swarm based logic technique. At operation 1110, identifying, by the detection module (114), the faulty node based on the detected anomaly. In an embodiment, the detection module (114) is configured to identify the faulty node based on the detected anomaly. At operation 1112, identifying, by an identification module (118), a control mechanism based on a healing profile. In an embodiment, an identification module (118) is configured to identify a control mechanism based on a healing profile. At operation 1114, transmitting, by the identification module (118), the identified control mechanism to the identified faulty node. In an embodiment, an identification module (118) is configured to transmit the identified control mechanism to the identified faulty node. At operation 1116, correcting, by a correction module (120), the faulty node by applying the control mechanism to the faulty node on the swarm. In an embodiment, a correction module (120) is configured to correct the faulty node by applying the control mechanism to the faulty node on the swarm.

Figure 12:
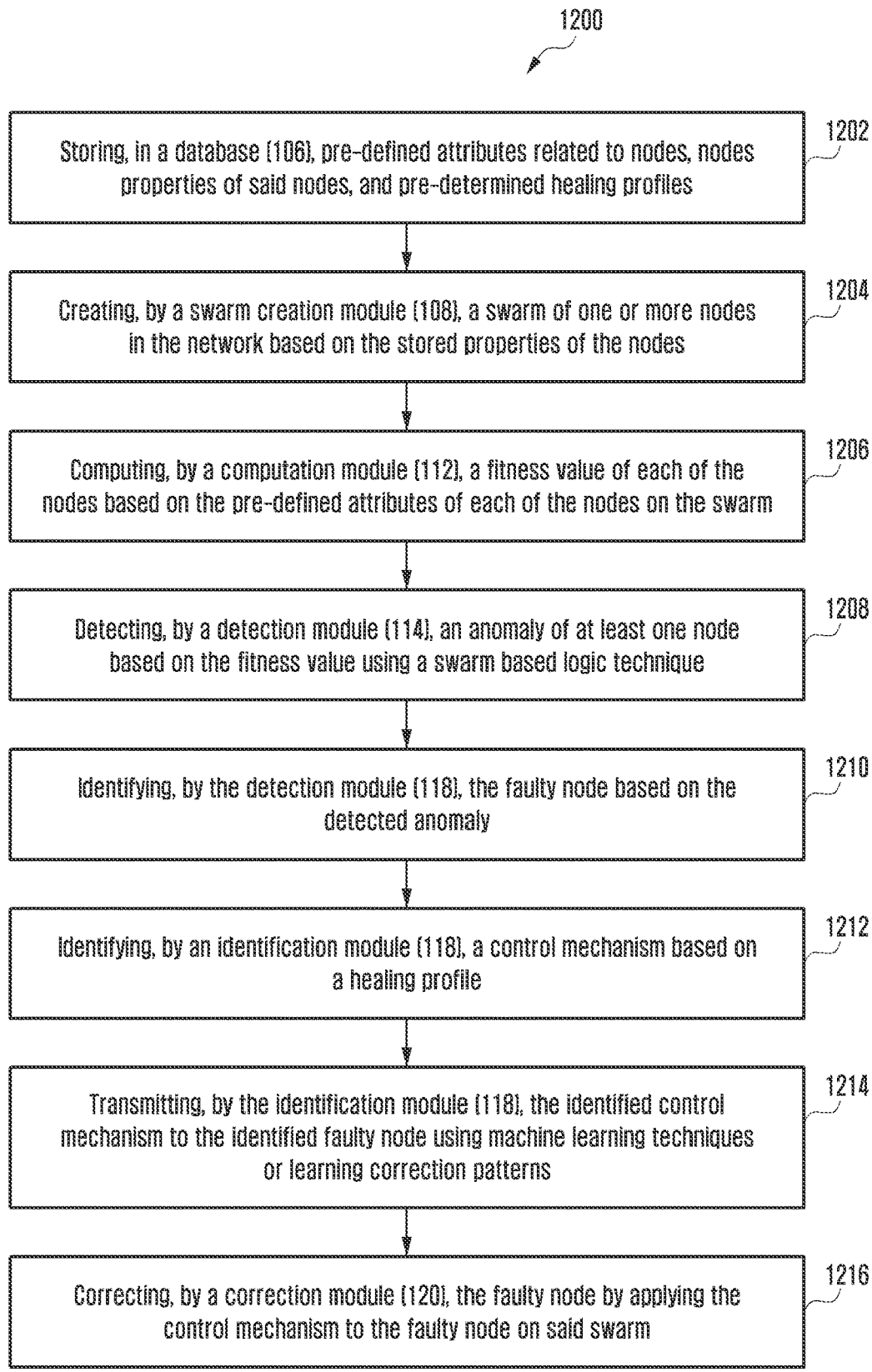
FIG. 12 illustrates a flowchart depicting a method for healing a faulty node in a network using machine learning techniques, according to an embodiment of the disclosure.

FIG. 12 illustrates a flowchart (1200) depicting a method for healing a faulty node in a network using machine learning techniques, according to an embodiment of the disclosure.

The flowchart (1200) starts at operation 1202, storing, in a database (106), pre-defined attributes related to nodes, nodes properties of the nodes, and pre-determined healing profiles. In an embodiment, a database (106) is configured to store pre-defined attributes related to nodes, nodes properties of the nodes, and pre-determined healing profiles. At operation 1204, creating, by a swarm creation module (108), a swarm of one or more nodes in the network based on the stored properties of the nodes. In an embodiment, a swarm creation module (108) is configured to create a swarm of one or more nodes in the network based on the stored properties of the nodes. At operation 1206, computing, by a computation module (112), a fitness value of each of the nodes based on the pre-defined attributes of each of the nodes on the swarm. In an embodiment, a computation module (112) is configured to compute a fitness value of each of the nodes based on the pre-defined attributes of each of the nodes on the swarm. At operation 1208, detecting, by a detection module (114), an anomaly of at least one node based on the fitness value using a swarm based logic technique. In an embodiment, a detection module (114) is configured to detect an anomaly of at least one node based on the fitness value using a swarm based logic technique. At operation 1210, identifying, by the detection module (114), the faulty node based on the detected anomaly. In an embodiment, the detection module (114) is configured to identify the faulty node based on the detected anomaly. At operation 1212, identifying, by an identification module (118), a control mechanism based on a healing profile. In an embodiment, an identification module (118) is configured to identify a control mechanism based on a healing profile. At operation 1214, transmitting, by the identification module (118), the identified control mechanism to the identified faulty node using machine learning techniques or learning correction patterns. In an embodiment, an identification module (118) is configured to transmit the identified control mechanism to the identified faulty node using machine learning techniques or learning correction patterns. At operation 1216, correcting, by a correction module (120), the faulty node by applying the control mechanism to the faulty node on the swarm. In an embodiment, a correction module (120) is configured to correct the faulty node by applying the control mechanism to the faulty node on the swarm.

Figure 13:
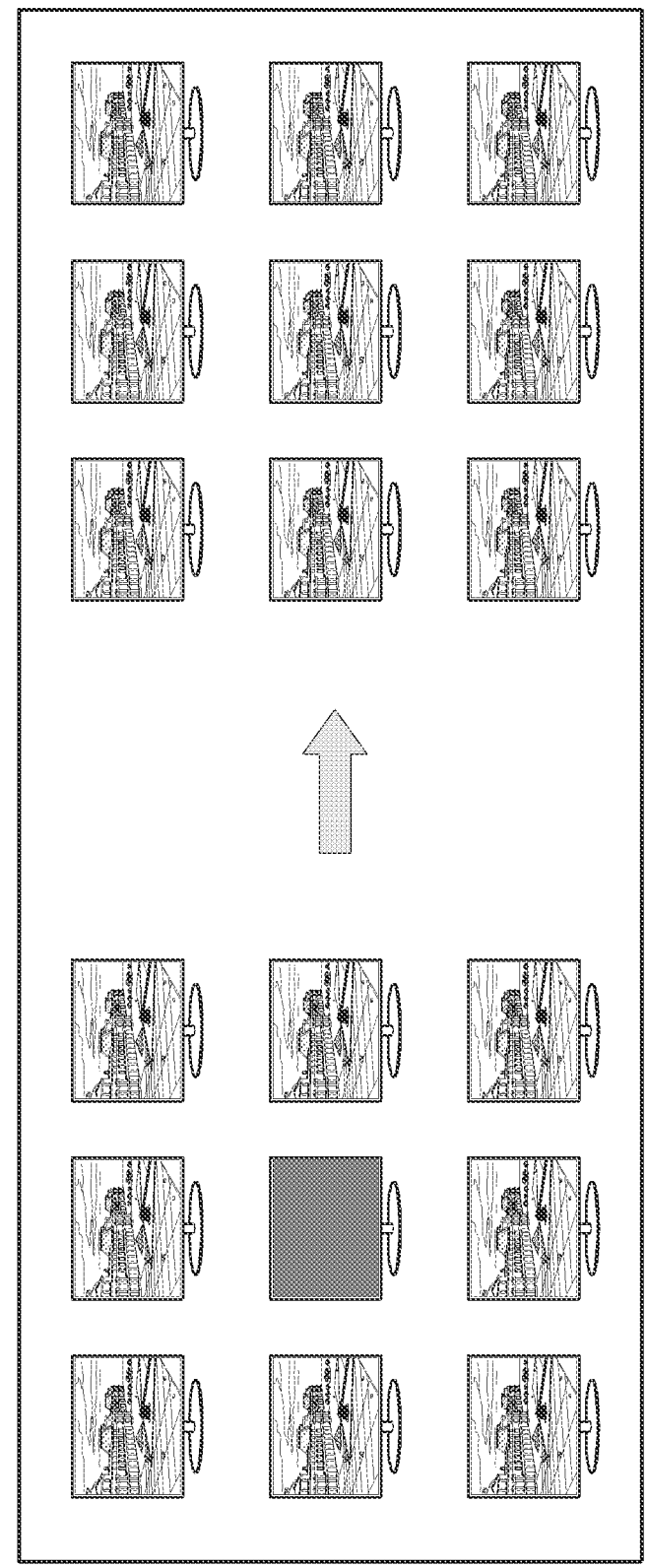
FIG. 13 illustrates a use-case scenario depicting a swarm of display devices, according to an embodiment of the disclosure.

FIG. 13 illustrates a use-case scenario (1300) depicting a swarm of display devices, according to an embodiment of the disclosure.

Referring to FIG. 13, a group of display devices play same content, and form a swarm. One of the devices has started malfunctioning (for example, displays black screen). The other devices of the swarm detect the error and send correction command/control mechanisms. Thereafter, the device error is fixed automatically.

Figure 14:
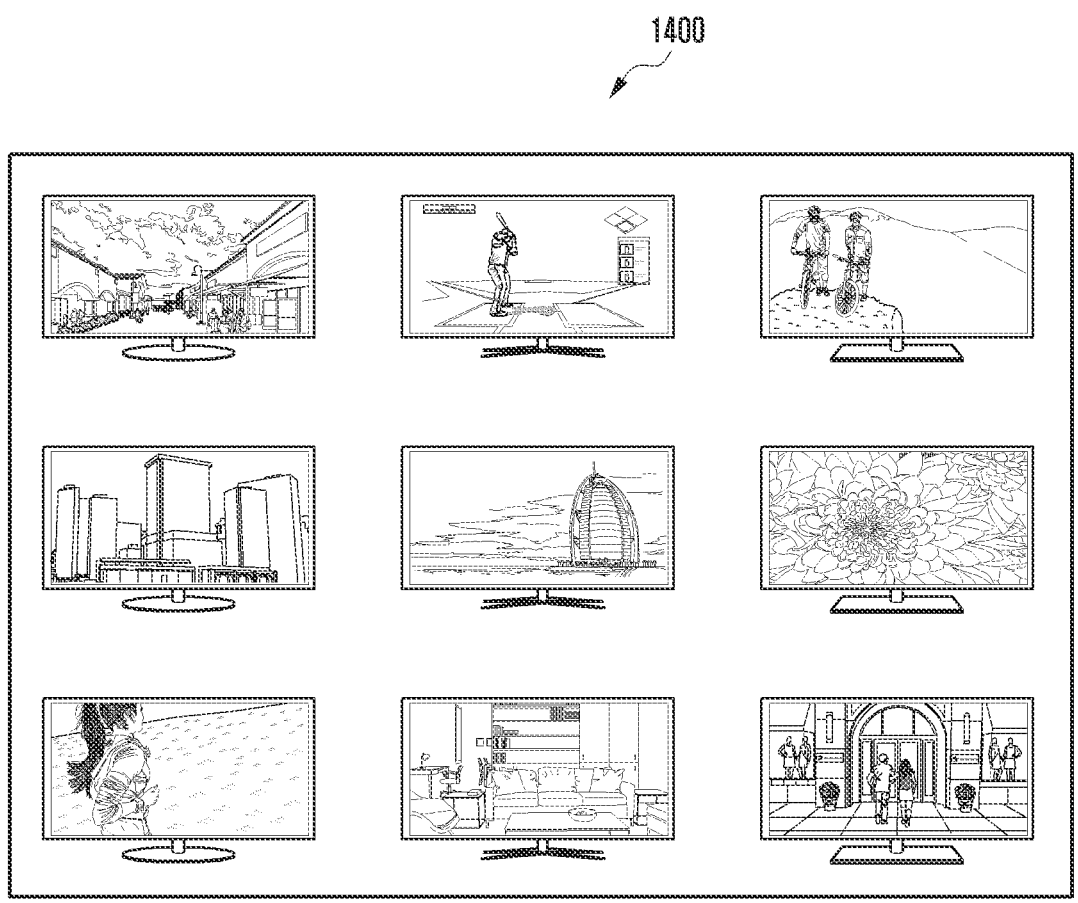
FIG. 14 illustrates a use-case scenario depicting a swarm of televisions, according to an embodiment of the disclosure; and Throughout the drawings, it should be noted that like reference numbers are used to depict the same or similar elements, features, and structures.

FIG. 14 illustrates a use-case scenario (1400) depicting a swarm of televisions, according to an embodiment of the disclosure.

Referring to FIG. 14, multiple televisions are connected over a network and form a swarm. Each television of the swarm monitor/compute the fitness parameters/values, which can improve the health device. When any television's fitness value is deviating from the trend that the television is classified as an anomaly. The television has a capability to self-heal or take help of other devices in correcting the parameter.

In an embodiment, if the faulty node on the swarm has freezing (crashing) issues, then the swarm based logic technique indicates an abnormality, and a trigger point then gets reset. In another embodiment, if the faulty node on the swarm has memory issues, the system (100) performs predictive behavior that indicates outlier, and a trigger point then clear the memory. In one embodiment, if the faulty node has black screen (or panel) issues, the system (100) performs relative logic that indicates an anomaly, and a neighbor panel transmits a recover command/control mechanism.

The system (100) provides following:
1. Preventive measures using swarm
   1.1 identification of the possible risk cases in advance; and
   1.2 Apply correction before they turned down to serious issue.
2. Corrective measure using a swarm based logic technique:
   2.1 Self-Healing, if problem occurred.
3. Server based learning (i.e. updating cure parameters).

In an embodiment, the system (100) provides server-less mechanism, and using only the local devices to generate the logic that can identify the outlier (anomaly) and then to heal it.

In an embodiment, a server comes into picture only when the system (100) wants to upload the learning pattern to a cloud so that some other group can use the learning and fix the issue automatically, autonomously.

In an embodiment, the system (100) provides the mechanism for preventing the device/nodes before it goes into a bad state which minimizes the chance of downtime of devices/nodes. The fitness function and health status sharing within the group generate local majority logic to trigger the preventive actions or corrective actions to heal the device/node automatically.

In another embodiment, the system (100) detects anomaly of the faulty node and heal the anomaly. The main effect for providing the feature of detection and healing the anomaly is to:

1. reduce defects
   1.1 Handling major anomalies (CPU Memory, Black Screen etc.) lead to reduce issues.
2. Provide quick Self-Healing
   2.1 Heal the affected panel within seconds.
3. Provide preventive measures
   3.1 Outlier can be detected and cured before it goes down; and
   3.2 Relevant logs identify the cause of issues; and
4. No Manual Intervention.

It should be noted that the description merely illustrates the principles of the disclosure. It will thus be appreciated that those skilled in the art will be able to devise various arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

In an embodiment of method for self-healing a plurality of electronic devices in a network, the method comprises forming, by a swarm creation module, a swarm the electronic devices connected in the network, storing first data and second data which are related to the electronic devices on the formed swarm in a database of the swarm, computing, based on the first data, third data of the electronic devices on the formed swarm, comparing the third data with the first data related to the electronic devices, identifying, based on the compared results, a faulty of the electronic devices on the swarm, and correcting, by applying the second data, the faulty of the electronic devices which are identified.

In another embodiment of the method, wherein the storing first data and second data which are related to the electronic devices on the formed swarm in a database of the swarm comprises sharing, by the electronic devices on the formed swarm, the first data and the second data. In another embodiment of the method, wherein the first data include attributes of the electronic devices and pre-determined properties of the electronic devices and the second data include pre-determined healing profiles and pre-determined control mechanism. In another embodiment of the method, wherein the forming, by a swarm creation module, a swarm the electronic devices connected in the network comprises selecting an agent electronic device among the electronic devices on the formed swam. In another embodiment of the method, wherein the comparing the third data with the first data related to the electronic devices comprises comparing, by the agent electronic device, the third data based on the first data related to the electronic devices on the formed swarm. In another embodiment of the method, wherein the method further comprises receiving additional data other than the second data from external devices and storing the received additional data in the database of the swarm or in a memory of the agent electronic device with updating. In another embodiment of the method, wherein the identifying, based on the compared results, a faulty of the electronic devices on the swarm comprises identifying electronic devices out of a range of the first data are faulty if the third data of the electronic devices on the formed swarm are out of the range of the first data. In another embodiment of the method, wherein the correcting, by applying the second data, the faulty of the electronic devices which are identified comprises correcting the faulty as controlling the computed third data in to a range of the first data by the agent electronic device applying the second data of the identified electronic devices.

In an embodiment of a self-healing system for healing electronic devices in a network, the system comprises a memory configured to store pre-defined rules and a processor which is operatively connected to the memory configured to form a swarm the electronic devices connected in the network, store first data and second data which are related to the electronic devices on the formed swarm in a database of the swarm, compute third data of the electronic devices on the formed swarm based on the first data, compare the third data with the first data related to the electronic devices, identify a faulty of the electronic devices on the swarm based on the compared results, and correct the faulty of the electronic devices which are identified by applying the second data.

In another embodiment of a self-healing system, wherein the processor is configured to share, by the electronic devices on the formed swarm, the first data and the second data. In another embodiment of a self-healing system, wherein the first data include attributes of the electronic devices and pre-determined properties of the electronic devices and the second data include pre-determined healing profiles and pre-determined control mechanism. In another embodiment of a self-healing system, wherein the processor is configured to select an agent electronic device among the electronic devices on the formed swam. In another embodiment of a self-healing system, wherein the processor is configured to compare, by the agent electronic device, the third data based on the first data related to the electronic devices on the formed swarm. In another embodiment of a self-healing system, wherein the processor is further configured to receive additional data other than the second data from external devices and store the received additional data in the database of the swarm or in a memory of the agent electronic device with updating. In another embodiment of a self-healing system, wherein the processor is configured to correct the faulty as controlling the computed third data in to a range of the first data by the agent electronic device applying the second data of the identified electronic devices.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for self-healing electronic devices in a network, the method comprising:
   forming, by a swarm creation module, a swarm of a plurality of electronic devices connected in the network;
   storing first data and second data related to the plurality of electronic devices in a database of the swarm;
   computing, based on the first data, third data of the plurality of electronic devices;
   comparing the third data with the first data related to the plurality of electronic devices;
   identifying, based on the comparison, a faulty electronic device of the plurality of electronic devices; and
   correcting, by applying the second data, the identified faulty electronic device,
   wherein the second data comprise pre-determined healing profiles and pre-determined control mechanisms for healing, and
   wherein the identifying of the faulty electronic device of the plurality of electronic devices comprises identifying an electronic device of the plurality of electronic devices as faulty if the third data of the electronic device is out of a range of the first data.

2. The method of claim 1, wherein the storing of the first data and second data related to the plurality of electronic devices comprises:
   sharing, by the plurality of electronic devices, the first data and the second data.

3. The method of claim 1,
   wherein the first data comprise attributes of the plurality of electronic devices and pre-determined properties of the plurality of electronic devices.

4. The method of claim 1, wherein the forming of the swarm of the plurality of electronic devices connected in the network comprises:
   selecting an agent electronic device among the plurality of electronic devices.

5. The method of claim 4, wherein the comparing of the third data with the first data related to the plurality of electronic devices comprises:
   comparing, by the agent electronic device, the third data based on the first data related to the plurality of electronic devices.

6. The method of claim 4, the method further comprises:
   receiving additional data other than the second data from an external device; and
   storing the received additional data in one of the database of the swarm or in a memory of the agent electronic device with updating.

7. The method of claim 4, wherein the correcting of the identified faulty electronic device of the plurality of electronic devices comprises:
   transmitting, by the agent electronic device to the identified faulty electronic device, the second data of the identified faulty electronic device based on the comparison of the third data with the first data.

8. A self-healing system for healing electronic devices in a network, the system comprising:
   a memory configured to store pre-defined rules; and
   a processor which is operatively connected to the memory, the processor configured to:
   form a swarm of a plurality of electronic devices connected in the network,
   store first data and second data related to the plurality of electronic devices in a database of the swarm,
   compute third data of the plurality of electronic devices based on the first data,
   compare the third data with the first data related to the plurality of electronic devices,
   identify a faulty electronic device of the plurality of electronic devices based on the comparison, and
   correct the identified faulty electronic device by applying the second data,
   wherein the second data comprise pre-determined healing profiles and pre-determined control mechanisms for healing, and
   wherein the to identify a faulty electronic device of the plurality of electronic devices based on the comparison comprises identifying an electronic device of the plurality of electronic devices as faulty if the third data of the electronic device is out of a range of the first data.

9. The system of claim 8, wherein the processor is further configured to control the plurality of electronic devices to share the first data and the second data.

10. The system of claim 8,
wherein the first data comprise attributes of the plurality of electronic devices and pre-determined properties of the plurality of electronic devices.

11. The system of claim 8, wherein the processor is further configured to select an agent electronic device among the plurality of electronic devices.

12. The system of claim 11, wherein the processor is further configured to compare, by the agent electronic device, the third data based on the first data related to the plurality of electronic devices.

13. The system of claim 11, wherein the processor is further configured to:
receive additional data other than the second data from an external device, and
store the received additional data in one of the database of the swarm or in a memory of the agent electronic device with updating.

14. The system of claim 11, wherein, to correct the faulty electronic device, the processor is further configured to transmit, to the identified faulty electronic device, the second data of the identified faulty electronic device based on the comparison of the third data with the first data.

\* \* \* \* \*